US012695910B2

(12) United States Patent
Huo et al.

(10) Patent No.: US 12,695,910 B2
(45) Date of Patent: Jul. 28, 2026

(54) VIDEO ENCODING, DECODING METHOD AND DECODER

(71) Applicant: GUANGDONG OPPO MOBILE TELECOMMUNICATIONS CORP., LTD., Dongguan (CN)

(72) Inventors: Junyan Huo, Dongguan (CN); Yanzhuo Ma, Dongguan (CN); Fuzheng Yang, Dongguan (CN); Wenhan Qiao, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/909,663

(22) Filed: Oct. 8, 2024

(65) Prior Publication Data

US 2025/0030894 A1      Jan. 23, 2025

Related U.S. Application Data

(63) Continuation of application No. PCT/CN2022/086473, filed on Apr. 13, 2022.

(51) Int. Cl.
H04N 19/61          (2014.01)
H04N 19/11          (2014.01)
(Continued)

(52) U.S. Cl.
CPC ............. H04N 19/61 (2014.11); H04N 19/11 (2014.11); H04N 19/176 (2014.11); H04N 19/18 (2014.11)

(58) Field of Classification Search
CPC ...... H04N 19/61; H04N 19/11; H04N 19/176; H04N 19/18
(Continued)

(56) References Cited

U.S. PATENT DOCUMENTS

2009/0116550 A1*  5/2009  Bjontegaard ........ H04N 19/176
                                              375/240.03
2016/0353132 A1* 12/2016  Davies ................... H04N 19/82
                          (Continued)

FOREIGN PATENT DOCUMENTS

CN          113615182 A      11/2021
CN          113632488 A      11/2021
                    (Continued)

OTHER PUBLICATIONS

International Search Report in the international application No. PCT/CN2022/086473, mailed on Nov. 29, 2022, 5 pages with English translation.
(Continued)

*Primary Examiner* — Justin W Rider
(74) *Attorney, Agent, or Firm* — BAYES PLLC

(57)          ABSTRACT

A video encoding, decoding method and a decoder are disclosed. The method includes: decoding a bitstream to determine a first-type intra prediction mode parameter of a current block; determining first prediction values of the current block according to the first-type intra prediction mode parameter; determining a first transform parameter of the current block based on the first prediction values of the current block or the first-type intra prediction mode parameter of the current block; determining, based on the first transform parameter, a second transform parameter for transforming the current block; transforming, based on the second transform parameter, transform coefficients of the current block to determine residuals of the current block; and determining reconstructed values of the current block based on the residuals and the first prediction values.

18 Claims, 6 Drawing Sheets

(51) Int. Cl.
    *H04N 19/176*      (2014.01)
    *H04N 19/18*      (2014.01)
(58) Field of Classification Search
    USPC ..................................................... 375/240.18
    See application file for complete search history.

(56)               References Cited

U.S. PATENT DOCUMENTS

| | | | |
|---|---|---|---|
| 2020/0296356 | A1 | 9/2020 | Mora et al. |
| 2020/0389666 | A1 | 12/2020 | Zhao et al. |
| 2021/0314619 | A1 | 10/2021 | Jung et al. |
| 2022/0014742 | A1 | 1/2022 | Gao et al. |
| 2022/0038740 | A1 | 2/2022 | Zhao et al. |
| 2022/0038744 | A1 | 2/2022 | Nam et al. |
| 2022/0053214 | A1 | 2/2022 | Zhao et al. |
| 2022/0053215 | A1 | 2/2022 | Zhao et al. |
| 2022/0060751 | A1 | 2/2022 | Nam et al. |
| 2022/0132109 | A1* | 4/2022 | Choi .................... H04N 19/105 |
| 2022/0360785 | A1 | 11/2022 | Huo et al. |

FOREIGN PATENT DOCUMENTS

| | | | | |
|---|---|---|---|---|
| CN | 113841407 | A | 12/2021 | |
| CN | 111771382 | B * | 12/2022 | ........... H04N 19/117 |
| JP | 2021509789 | A | 4/2021 | |
| RU | 2767188 | C1 * | 3/2022 | ............. H04N 19/59 |

| | | | |
|---|---|---|---|
| WO | 2020226424 | A1 | 11/2020 |
| WO | 2020259630 | A1 | 12/2020 |
| WO | 2020260248 | A1 | 12/2020 |
| WO | 2021134635 | A1 | 7/2021 |
| WO | 2021139572 | A1 | 7/2021 |
| WO | 2021196231 | A1 | 10/2021 |

OTHER PUBLICATIONS

English translation of the Written Opinion of the International Search Authority in the international application No. PCT/CN2022/086473, mailed on Nov. 29, 2022, 8 pages with English translation.

First Office Action of the Chilean application No. 202403047, issued on Nov. 14, 2025.

Supplementary European Search Report in the European application No. 22936849.3, mailed on Dec. 18, 2025.

First Office Action of the Japanese application No. 2024-560291, issued on Jan. 6, 2026.

First Office Action of the United Arab Emirates application No. P2024/02665, issued on Feb. 13, 2026.

Written Opinion of the Singaporean application No. 11202407041S, issued on May 12, 2026.

First Office Action of the United Arab Emirates application No. P2025/00657, issued on May 24, 2026.

Recommendation for Grant of the Chilean application No. 202403047, issued on May 18, 2026.

* cited by examiner

Forward LFNST
transform

Encoder
side:

Inverse LFNST
transform

Decoder
side:

Bitstream

Input video

Divide into
coding blocks

Quantized transform
coefficients

Output
bitstream

Intra/inter
selection

Intra prediction data

Motion data

Output video
signal

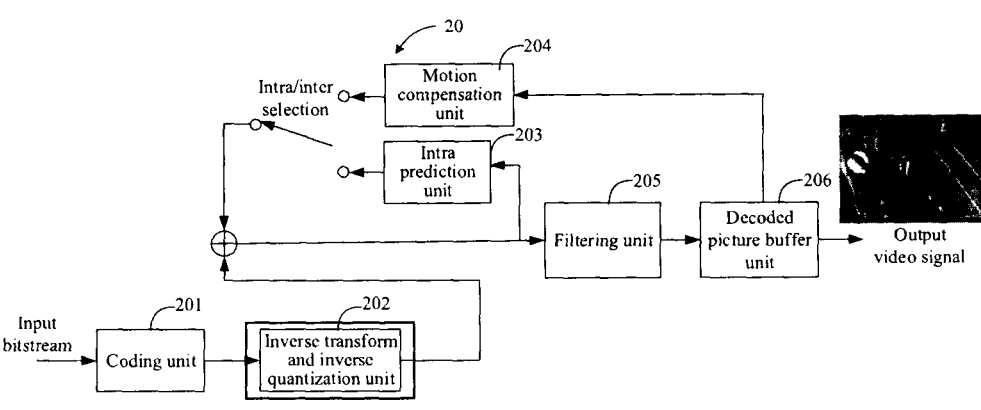

FIG. 2B

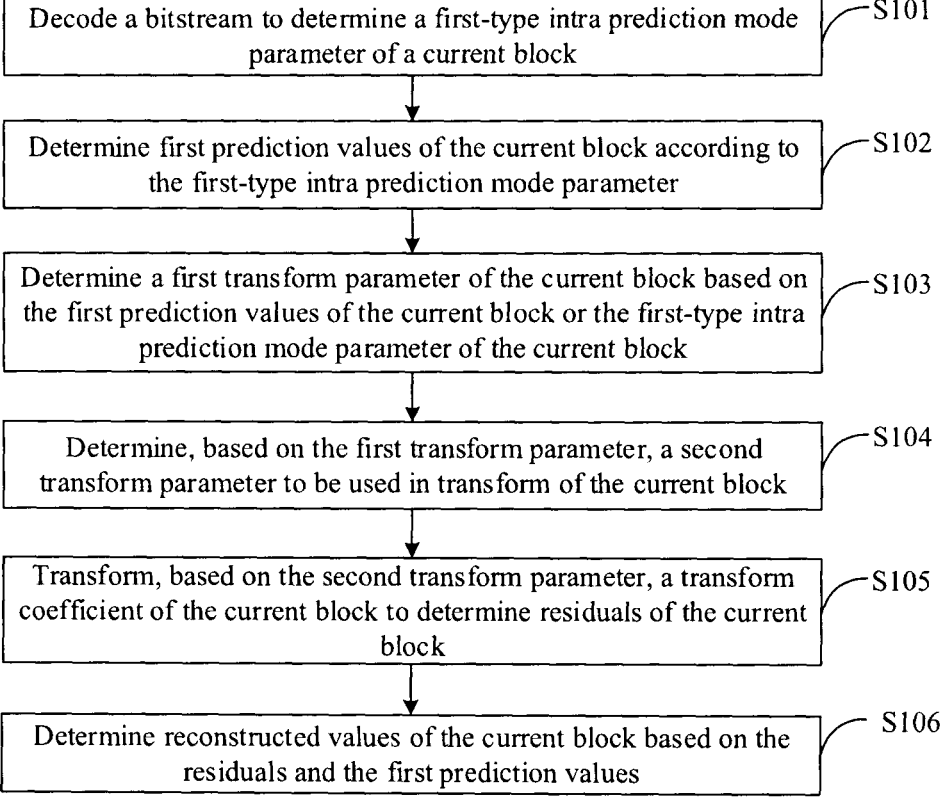

| | |
|---|---|
| Decode a bitstream to determine a first-type intra prediction mode parameter of a current block | S101 |
| Determine first prediction values of the current block according to the first-type intra prediction mode parameter | S102 |
| Determine a first transform parameter of the current block based on the first prediction values of the current block or the first-type intra prediction mode parameter of the current block | S103 |
| Determine, based on the first transform parameter, a second transform parameter to be used in transform of the current block | S104 |
| Transform, based on the second transform parameter, a transform coefficient of the current block to determine residuals of the current block | S105 |
| Determine reconstructed values of the current block based on the residuals and the first prediction values | S106 |

FIG. 3

Transform matrix T · Primary transform coefficients= Secondary transform coefficients

[8x16 ]  ·   [16x1 prim]   =   [8x1 sec]

Transform matrix T • Primary transform coefficients= Secondary transform coefficients $$[16x16] \cdot [16x1\ prim] = [16x1\ sec]$$

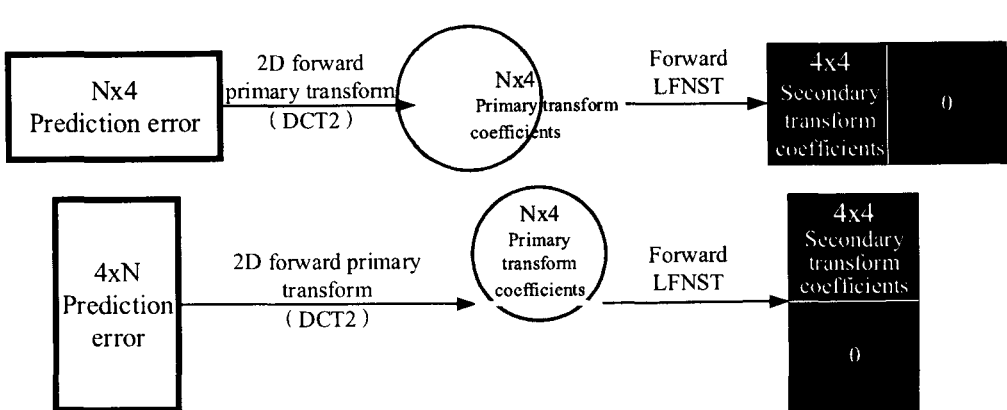

FIG. 6B

Transform matrix T • Primary transform coefficients= Secondary transform coefficients $$[8x48] \cdot [48x1\ prim] = [8x1\ sec]$$

4x2Secondary
transform coefficients

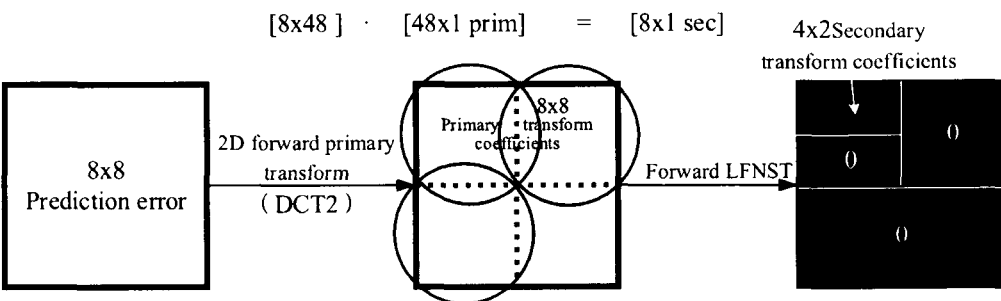

FIG. 6C

Transform matrix T • Primary transform coefficients= Secondary transform coefficients $$[16x48] \cdot [48x1\ prim] = [16x1\ sec]$$

4x4Secondary
transform coefficients

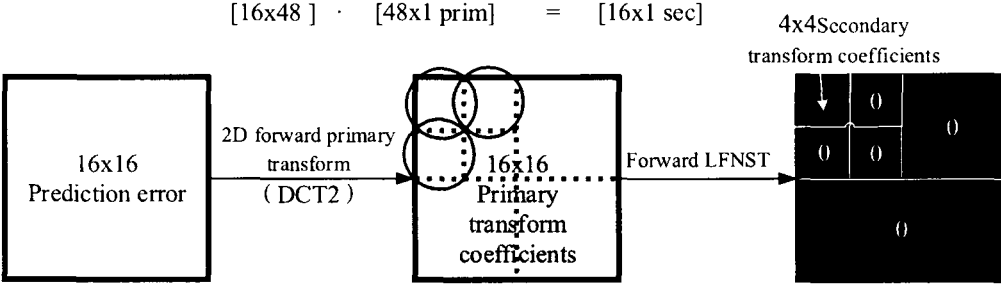

VIDEO ENCODING, DECODING METHOD AND DECODER

CROSS-REFERENCE TO RELATED APPLICATION

This application is a continuation of International Patent Application No. PCT/CN2022/086473 filed on Apr. 13, 2022, the disclosure of which is hereby incorporated by reference in its entirety.

BACKGROUND

With people's improving requirements for display quality of video, new forms of video application such as high-definition video and ultra-high-definition video have emerged. The Joint Video Exploration Team (JVET) of the International Organization for Standardization (ISO)/International Electro Technical Commission (IEC) and International Telecommunication Union Telecommunication Standardization Sector (ITU-U) has made a video coding standard H.266/Versatile Video Coding (VVC). The H.266/VCC contains a transform technique associated with a coding mode of a coding block. However, the transform technique is not adapted to non-angular prediction encoding modes, reducing coding efficiency.

SUMMARY

Embodiments of the disclosure provide a method for video encoding, a method for video decoding, and a decoder.

The technical solution of the embodiments of the disclosure may be implemented as follows.

In a first aspect, embodiments of the disclosure provide a method for video decoding, applied to a decoder. The method includes following operations. A bitstream is decoded to determine a first-type intra prediction mode parameter of a current block. First prediction values of the current block are determined according to the first-type intra prediction mode parameter. A first transform parameter of the current block is determined based on the first prediction values of the current block or the first-type intra prediction mode parameter of the current block. A second transform parameter for transforming the current block is determined based on the first transform parameter. Transform coefficients of the current block are transformed based on the second transform parameter, to determine residuals of the current block. Reconstructed values of the current block are determined based on the residuals and the first prediction values.

In a second aspect, embodiments of the disclosure provide a method for video encoding, applied to an encoder. The method includes following. A first-type intra prediction mode parameter is determined. First prediction values of a current block are determined according to the first-type intra prediction mode parameter, and residuals between original values of the current block and the first prediction values are calculated. A first transform parameter of the current block is determined based on the first prediction values of the current block or the first-type intra prediction mode parameter of the current block. A second transform parameter for transforming the current block is determined based on the first transform parameter. The residuals are transformed based on the second transform parameter, to obtain transform coefficients of the current block.

In a third aspect, embodiments of the disclosure provide a decoder, including: a memory configured to store a computer program executable on a processor; and the processor configured to execute the computer program to implement operations of: decoding a bitstream to determine a first-type intra prediction mode parameter of a current block; determining first prediction values of the current block according to the first-type intra prediction mode parameter; determining a first transform parameter of the current block based on the first prediction values of the current block or the first-type intra prediction mode parameter of the current block; determining, based on the first transform parameter, a second transform parameter for transforming the current block; transforming, based on the second transform parameter, transform coefficients of the current block to determine residuals of the current block; and determining reconstructed values of the current block based on the residuals and the first prediction values

BRIEF DESCRIPTION OF THE DRAWINGS

FIG. 2B illustrates a block diagram of composition of a video decoding system according to embodiments of the disclosure.

FIG. 3 illustrates a schematic flowchart of a method for video decoding according to embodiments of the disclosure.

FIG. 6B illustrates a structural block diagram of another LFNST transform in related technical solutions.

FIG. 6C illustrates a structural block diagram of yet another LFNST transform in related technical solutions.

FIG. 6D illustrates a structural block diagram of still another LFNST transform in related technical solutions.

DETAILED DESCRIPTION

For understanding the characters and technical contents of the embodiments of the disclosure more thoroughly, implementations of the embodiments of the disclosure are described in detail below in conjunction with accompanying drawings which are for reference and illustration only, and are not intended to limit the embodiments of the disclosure.

In video pictures, a first colour component, a second colour component and a third colour component are generally used to represent a Coding Block (CB). The three colour components are a luma component, a blue chroma component and a red chroma component respectively. Exemplarily, the luma component is usually denoted by a sign Y, the blue chroma component is usually denoted by a sign Cb or U, and the red chroma component is usually denoted by a sign Cr or V. As such, a video picture may be represented in a YCbCr format, or a YUV format. Besides, a video picture may also be in an RGB format, a YcgCo format or the like, which is not limited in the embodiments of the disclosure.

In the embodiments of the disclosure, the first colour component may be a luma component, the second colour component may be a blue chroma component, and the third colour component may be a red chroma component, which is not limited in the embodiments of the disclosure.

The embodiments of the disclosure may be applicable for a low-frequency non-separable transform (LFNST) scenario or an extended LFNST scenario, or scenarios of other transform techniques that need to be associated with a coding mode of a coding block, which is not limited in the embodiments of the disclosure.

Related technical solutions of the LFNST technique are described hereinafter.

Figure 1:
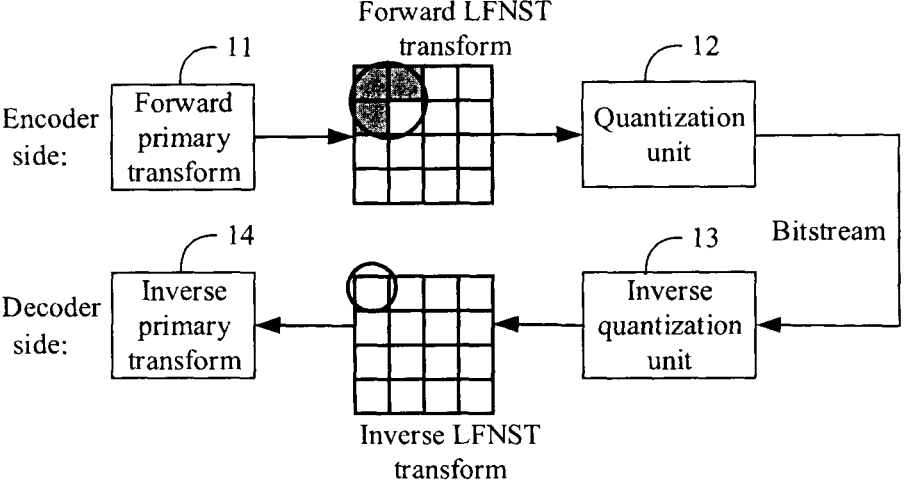
FIG. 1 illustrates a schematic diagram of a position where an LFNST technique is applied in related technical solutions.

Referring to FIG. 1 which illustrates a schematic diagram of a position where an LFNST technique is applied in related technical solutions. As illustrated in FIG. 1, in an intra prediction mode, for an encoder side, the LFNST technique is applied between a forward primary transform unit 11 and a quantization unit 12, and the LFNST technique is applied in an inverse quantization unit 13 and an inverse primary transform unit 14.

At the encoder side, firstly, data such as a prediction residual (which may be represented as a residual) may be transformed for a first time (which may be referred to as "core transform" or "primary transform" or "main transform") by the forward first transform unit 11 to obtain a transform coefficient matrix (i.e., a second transform coefficient) having subjected to the first transform. Then LFNST transform (which may be referred to as "secondary transform" or "second transform") may be performed on a coefficient in the transform coefficient matrix to obtain an LFNST transform coefficient matrix (i.e., a first transform coefficient). At last, the LFNST transform coefficient matrix is quantized by the quantization unit 12, and a final quantized coefficient is written into a bitstream.

At a decoder side, by parsing the bitstream, the quantized coefficient of the LFNST transform coefficient matrix may be obtained. The inverse quantization (which may be referred to as scaling) is performed on the quantized coefficient by the inverse quantization unit 13 to obtain a recovered value (i.e., the first transform coefficient) of the LFNST transform coefficient matrix. The second transform coefficient may be obtained by performing inverse LFNST transform on the recovered value. Then inverse transform corresponding to the "core transform" performed at the encoder side is performed on the second transform coefficient by the inverse primary transform unit 14, to obtain a recovered value of the residual. It is to be noted that, merely an "inverse transform" operation at the decoder side is defined in the standards, and therefore "inverse LFNST transform" is also referred to as "LFNST transform" in the standards. Here, to distinguish the transform performed at the decoder side and the encoder side, the "LFNST transform" performed at the encoder side may be referred to as "forward LFNST transform", and the "LFNST transform" performed at the decoder side may be referred to as "inverse LFNST transform".

That is to say, at the encoder side, primary transform coefficients (namely the second transform coefficient) may be obtained by performing forward primary transform on prediction residuals of a current transform unit (TU); then secondary transform is performed on some of the primary transform coefficients by multiplication with a transform matrix to obtain secondary transform coefficients (namely the first transform coefficient) of a smaller number and more concentrated which are then quantized to obtain a quantized coefficient. At the decoder side, after the quantized coefficient is parsed out, inverse quantization is performed on the quantized coefficient to obtain the first transform coefficient; then inverse secondary transform is performed through matrix multiplication on the first transform coefficient that is obtained by the inverse quantization; next inverse primary transform is performed on the first transform coefficient having subjected to the inverse second transform, so as to recover the prediction residuals.

In technologies related to LFNST, a process of LFNST transform may include following operations: configuring core parameters, intra prediction mode mapping, selecting a transform matrix, calculating a matrix multiplication, constructing an inverse primary transform coefficient matrix and so on. After these operations, the LFNST transform is completed. However, in the operation of selecting the transform matrix (i.e., a transform kernel), a transform set needs to be selected at first. Since the transform matrix is related to directional characteristics of a prediction mode, the transform set is selected according to an intra prediction mode. For a traditional intra prediction mode, a value of an intra prediction mode indicator (which may be denoted as predModeIntra), namely, a value of the first transform parameter, may be determined according to a serial number of the traditional intra prediction mode. Then a transform set index number is determined according to the value of predModeIntra. However, for a non-traditional intra prediction mode, especially the Matrix-based Intra Prediction (MIP) mode, the value of predModeIntra is directly set to indicate an index number (i.e., 0) of an intra prediction mode corresponding to the PLANAR mode, rendering that only the transform set with a transform set index number 0 can be selected for the current block in the MIP mode. It is resulted that there is a lack of variability in LFNST transform of the current block in the MIP mode, rendering that the LFNST technique cannot be well adapted to the MIP mode, and the coding efficiency is reduced.

Embodiments of the disclosure provide a method for video decoding, applied to a decoder. First prediction values of a current block are determined according to a first-type intra prediction mode parameter. A first transform parameter of the current block is determined based on the first prediction values of the current block or the first-type intra prediction mode parameter of the current block. A second transform parameter for transforming the current block is determined based on the first transform parameter. Transform coefficients of the current block is transformed based on the second transform parameter, to determine residuals of the current block. Reconstructed values of the current block are determined based on the residuals and the first prediction values. As such, for the current block encoded using the first-type intra prediction mode (such as Matrix-based Intra Prediction (MIP)), since the first prediction values or the first-type intra prediction mode parameter of the current block is introduced in low-frequency non-separable transform (LFNST), the selection of a transform kernel or a transform matrix (corresponding to the second transform parameter) in the transform technique is more flexible. Thus, not only the applicability of non-traditional intra prediction mode (the first-type intra prediction mode) is improved, but also decoding efficiency is improved; and picture quality in video can also be improved.

Embodiments of the disclosure provide a method for video encoding, applied to an encoder. A first-type intra prediction mode parameter is determined. First prediction values of a current block are determined according to the first-type intra prediction mode parameter, and residuals between original values of the current block and the first prediction values are calculated. A first transform parameter of the current block is determined based on the first prediction values of the current block or the first-type intra prediction mode parameter of the current block. A second transform parameter for transforming the current block is determined based on the first transform parameter. The residuals are transformed based on the second transform parameter, to obtain transform coefficients of the current block. As such, for the current block encoded using the first-type intra prediction mode (such as Matrix-based Intra Prediction (MIP)), since the first prediction values or the first-type intra prediction mode parameter of the current block is introduced in low-frequency non-separable transform (LFNST), the selection of a transform kernel or a transform matrix (corresponding to the second transform parameter) in the transform technique is more flexible. Thus, not only the applicability of non-traditional intra prediction mode (the first-type intra prediction mode) is improved, but also encoding efficiency is improved; and picture quality in video can also be improved.

Hereinafter, a system framework used in various embodiments of the disclosure will be described in detail with reference to the accompanying drawings.

Figure 2A:
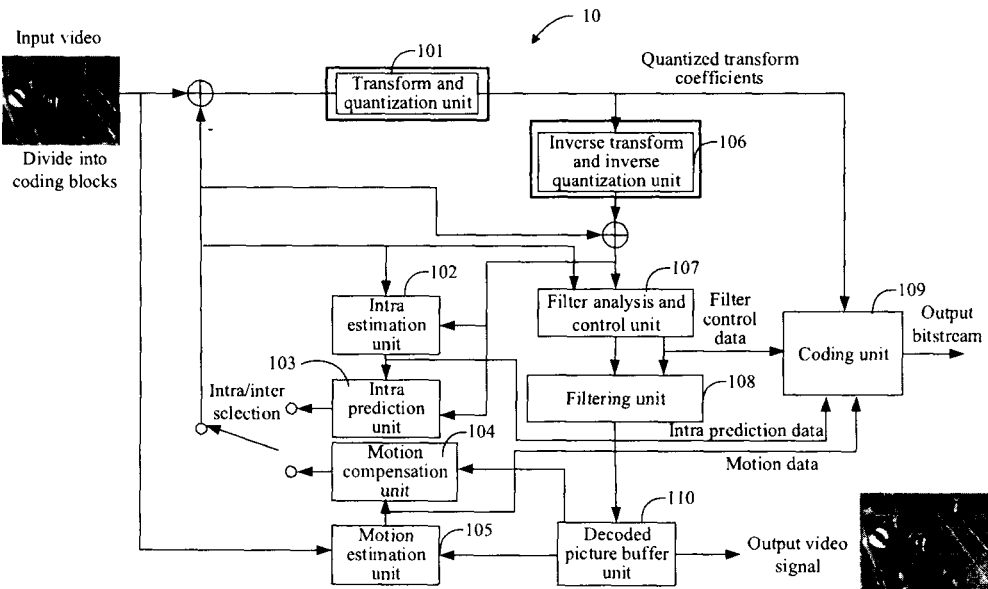
FIG. 2A illustrates a block diagram of composition of a video encoding system according to embodiments of the disclosure.

Referring FIG. 2A which illustrates an example of a block diagram of composition of a video encoding system according to embodiments of the disclosure. As illustrated in FIG. 2A, the video encoding system 10 includes a transform and quantization unit 101, an intra estimation unit 102, an intra prediction unit 103, a motion compensation unit 104, a motion estimation unit 105, an inverse transform and inverse quantization unit 106, a filter control and analysis unit 107, a filtering unit 108, an coding unit 109, a decoded picture buffer unit 110 and so on. The filtering unit 108 may implement deblocking filtering and sample adaptive offset (SAO) filtering. The coding unit 109 may implement header information encoding and Context-based Adaptive Binary Arithmatic Coding (CABAC). For an input original video signal, a video coding block can be obtained by division of a coding tree unit (CTU). Then residual pixel information of the video coding block obtained after intra or inter prediction is transformed by the transform and quantization unit 101, including transforming the residual information from a pixel domain to a transform domain and quantizing obtained transform coefficients, so as to further reduce a bit rate. The intra estimation unit 102 and the intra prediction unit 103 are used for intra prediction of the video coding block. Specifically, the intra estimation unit 102 and the intra prediction unit 103 are used for determining an intra prediction mode to encode the video coding block. The motion compensation unit 104 and the motion estimation unit 105 are used for inter prediction coding of the received video coding block with respect to one or more blocks in one or more reference pictures, so as to provide temporal prediction information.

The motion estimation conducted by the motion estimation unit 105 is a process of generating a motion vector that can be used to estimate motion of the video coding block; then the motion compensation unit 104 conducts motion compensation based on the motion vector determined by the motion estimation unit 105. After the intra prediction mode is determined, the intra prediction unit 103 is further configured to supply selected intra prediction data to the coding unit 109, and the motion estimation unit 105 also transmits the motion vector data determined by calculation to the coding unit 109. Further, the inverse transform and inverse quantization unit 106 is used for reconstructing the video coding block. In particular, a residual block is reconstructed in the pixel domain. Block artifacts are removed from the reconstructed residual block by the filter control and analysis unit 107 and the filtering unit 108, and then the reconstructed residual block is added to a predictive block in the picture of the decoded picture buffer unit 110 to generate the reconstructed video coding block. The coding unit 109 is used for encoding various coding parameters and quantized transform coefficients. In a CABAC-based coding algorithm, the context may be based on an adjacent coding block and may be used for encoding information indicating the determined intra prediction mode and outputting a bitstream of the video signal. The decoded picture buffer unit 110 is used for storing reconstructed video coding blocks, for prediction reference. With proceeding of video picture coding, new reconstructed video coding blocks are continuously generated and will be stored in the decoded picture buffer unit 110.

Referring FIG. 2B which illustrates an example of a block diagram of composition of a video decoding system according to embodiments of the disclosure. As illustrated in FIG. 2B, the video decoding system 20 includes a coding unit 201, an inverse transform and inverse quantization unit 202, an intra prediction unit 203, a motion compensation unit 204, a filtering unit 205, a decoded picture buffer unit 206 and so on. The coding unit 201 may implement header information decoding and CABAC decoding, and the filtering unit 205 may implement deblocking filtering and sample adaptive offset (SAO) filtering. After an input video signal is subjected to the encoding of FIG. 2A, a bitstream of the video signal is output. The bitstream is input into the video decoding system 20, and firstly passes through the coding unit 201 to obtain a decoded transform coefficient. The decoded transform coefficient is processed by the inverse transform and inverse quantization unit 202, so as to produce a residual block in the pixel domain. The intra prediction unit 203 may be configured to generate prediction data for a current video coding block based on a determined intra prediction mode and data from a previously decoded block of the current picture. The motion compensation unit 204 determines prediction information for the video coding block by parsing the motion vector and other associated syntax elements, and uses the prediction information to generate a predictive block of the video coding block being decoded. A decoded video block is formed by summing the residual block from the inverse transform and inverse quantization unit 202 and a corresponding predictive block produced by the intra prediction unit 203 or the motion compensation unit 204. The decoded video signal passes through the filtering unit 205 to remove block artifacts, so that the video quality can be improved. Then the decoded video block is stored in the decoded picture buffer unit 206. The decoded picture buffer unit 206 stores a reference picture for subsequent intra prediction or motion compensation, and is also used for outputting a video signal, namely to obtain a recovered original video signal.

The method for video encoding according to embodiments of the disclosure may be applied to the transform and quantization unit 101 part as illustrated in FIG. 2A. The transform and quantization unit 101 includes a forward primary transform unit 11 and a quantization unit 12 as illustrated in FIG. 1. In such a case, the method for video encoding is applied in a process after the transform and before the quantization. Additionally, the method for video decoding according to embodiments of the disclosure may be applied to the inverse transform and inverse quantization unit 202 part as illustrated in FIG. 2B. The inverse transform and inverse quantization unit 202 may include an inverse quantization unit 13 and an inverse primary transform unit 14 as illustrated in FIG. 1. In such a case, the method for video decoding is applied in a process after the inverse quantization and before the inverse transform. That it to say, the method for video encoding according to the embodiments of the disclosure is applied to a video encoding system, and the method for video decoding according to the embodiments of the disclosure is applied to a video decoding system. The method for video encoding/decoding according to the embodiments of the disclosure may even be applied to both a video encoding system and a video decoding system, which is not limited in the embodiments of the disclosure. It should also be noted that, when the method for video encoding is applied to a video encoding system, the "current block (namely transform unit)" may be a current coding block in intra prediction; and when the method for video decoding is applied to a video decoding system, the "current block (namely transform unit)" may be a current coding block in intra prediction.

Based on the application scenario example of FIG. 2B above, please refer to FIG. 3 which illustrates a schematic flowchart of a method for video decoding according to embodiments of the disclosure. The method is applied to a decoder. As illustrated in FIG. 3, the method may include following operations S101 to S106.

S101, a bitstream is decoded to determine a first-type intra prediction mode parameter of a current block.

In the embodiments of the disclosure, in a decoding process, the decoder decodes the bitstream to obtain a prediction mode parameter of a current block at first. The prediction mode parameter indicates a coding mode of the current block and parameters related to the coding mode. The prediction mode usually includes a traditional intra prediction mode and a non-traditional intra prediction mode. The traditional intra prediction mode may include such as a direct current (DC) mode, a planar mode, and an angular prediction mode. The non-traditional intra prediction mode (first-type intra prediction mode) may include such as a MIP mode, a Cross-Component Linear Model (CCLM) prediction mode, an intra block copy (IBC) mode, and a palette (PLT) mode.

It is to be noted that, in the embodiments of the disclosure, the second-type intra prediction mode represent a traditional intra prediction mode, and the first-type intra prediction mode represents a non-traditional intra prediction mode. The first-type intra prediction mode may be understood as a non-angular prediction mode.

During decoding, if the prediction mode parameter obtained by decoding represents the first-type intra prediction mode, the decoder determines the first-type intra prediction mode parameter of the current block in the bitstream.

In the embodiments of the disclosure, when the encoder encodes the current block, the encoder performs predictive encoding on the current block, in which process, a prediction mode of the current mode can be determined and a corresponding prediction mode parameter may be written into a bitstream which is transmitted by the encoder to the decoder.

It is to be noted that, the encoder may determine the prediction mode parameter of the current block by way of rate distortion optimization (RDO).

In the embodiments of the disclosure, decoding of the current block is also decoding processing for different colour components. A colour component indicator (which may be denoted by cIdx) is used to indicate a luma component or a chroma component of the current block.

Exemplarily, if a luma component is predicted for the current block, then cIdx is equal to 0; and if a chroma component is predicted for the current block, then cIdx is equal to 1. Additionally, (xTbY, yTbY) are coordinates of a sample point at the upper left corner of the current block. IntraPredModeY[xTbY][yTbY] is an intra prediction mode of the luma component, and IntraPredModeC[xTbY][yTbY] is an intra prediction mode of the chroma component.

After learning the prediction mode, the decoder can determine the first-type intra prediction mode parameter of the current block. The first-type intra prediction mode parameter is a parameter corresponding to a first-type intra prediction mode.

Exemplarily, when the first-type intra prediction mode is the MIP mode, the parameter corresponding to the first-type intra prediction mode is a MIP parameter.

The first-type intra prediction mode parameter may include such as a first-type intra prediction mode index (which may be denoted by modeId), a size of the current block, and a category of the current block (which may be denoted by mipSizeId), values of which may be obtained by decoding the bitstream. The MIP parameter may include such as a MIP transposition indication parameter (which may be denoted by isTransposed), a MIP mode index number (which may be denoted by modeId), a size of the current block, and a category of the current block (which may be denoted by mipSizeId).

In an implementation, the category of the current block is determined according to the size of the current block, which may include following.

If the width and height of the current block are both equal to 4, the value of mipSizeId may be set to 0.

On the contrary, if one of the width and height of the current block is equal to 4, or the width and height of the current block are both equal to 8, then the value of mipSizeId may be set to 1.

On the contrary, if the current block is of another size, then the value of mipSizeId may be set to 2.

In another implementation, the category of the current block is determined according to the size of the current block, which may include following.

If the width and height of the current block are both equal to 4, the value of mipSizeId may be set to 0.

On the contrary, if one of the width and height of the current block is equal to 4, the value of mipSizeId may be set to 1.

On the contrary, if the current block is of another size, then the value of mipSizeId may be set to 2.

In this way, in the process of determining the intra prediction value using MIP, the MIP parameter can also be determined, which facilitates determining an LFNST transform kernel (which may be represented by a kernel) used for the current block according to the determined MIP parameter.

Description is made below with the MIP parameter as an example.

In some embodiments, the value of isTransposed may be determined by decoding the bitstream. When the value of isTransposed is equal to 1, a sample point input vector used in the MIP mode needs to be transposed. When the value of isTransposed is equal to 0, there is no need to transpose the sample point input vector used in the MIP mode. That is to say, the MIP transposition indication parameter may be used to indicate whether to transpose the sample point input vector used in the MIP mode.

In some embodiments, by decoding the bitstream, a MIP mode index number (which may be denoted by modeId) may also be determined. The MIP mode index number may be used to indicate the MIP mode used for the current block, and the MIP mode may be used to indicate a calculation and derivation method of determining the intra prediction value of the current block using MIP. That is to say, in the MIP mode, since there are many kinds of MIP modes, these kinds of MIP modes can be distinguished from one another by MIP mode index numbers. That is, different MIP modes have different MIP mode index numbers respectively. In this way, according to the calculation and derivation method of determining the intra prediction value of the current block using MIP, a specific MIP mode can be determined, and thus a corresponding MIP mode index number can be obtained. In embodiments of the disclosure, the value of the MIP mode index number may be 0, 1, 2, 3, 4, or 5.

In some embodiments, by decoding the bitstream, parameter information such as the size of the current block, the aspect ratio of the current block, and the category of the current block (which may be denoted by mipSizeId) may also be determined. Thus, after the MIP parameter is determined, it is facilitated in subsequently selecting a transform kernel (which may be represented by a kernel, such as an LFNST transform kernel) or a scanning sequence parameter used for the current block according to the determined MIP parameter, or determining first prediction values of the current block according to the determined MIP parameter and selecting the transform kernel or the scanning sequence parameter based on the first prediction values.

S102, first prediction values of the current block are determined according to the first-type intra prediction mode parameter.

In the embodiments of the disclosure, the decoder may perform intra prediction with the first-type intra prediction mode parameter, so as to determine the first prediction values of the current block.

Description is made with the first-type intra prediction mode parameter being the MIP parameter as an example.

In the embodiments of the disclosure, for the MIP mode, the input data of MIP prediction includes: a position of the current block (xTbCmp, yTbCmp), a MIP prediction mode applied to the current block (which may be denoted by modeId), a height of the current block (which may be denoted by nTbH), a width of the current block (which may be denoted by nTbW), a transposition processing indication flag (which may be denoted by isTransposed) indicating whether transposition is needed, and the like. The output data of the MIP prediction includes: a predicted block of the current block, and the intra prediction value corresponding to the pixel coordinates [x][y] in the predicted block is predSamples [x][y], where x=0, 1, . . . , nTbW−1, and y=0, 1, . . . , nTbH−1.

Figure 4:
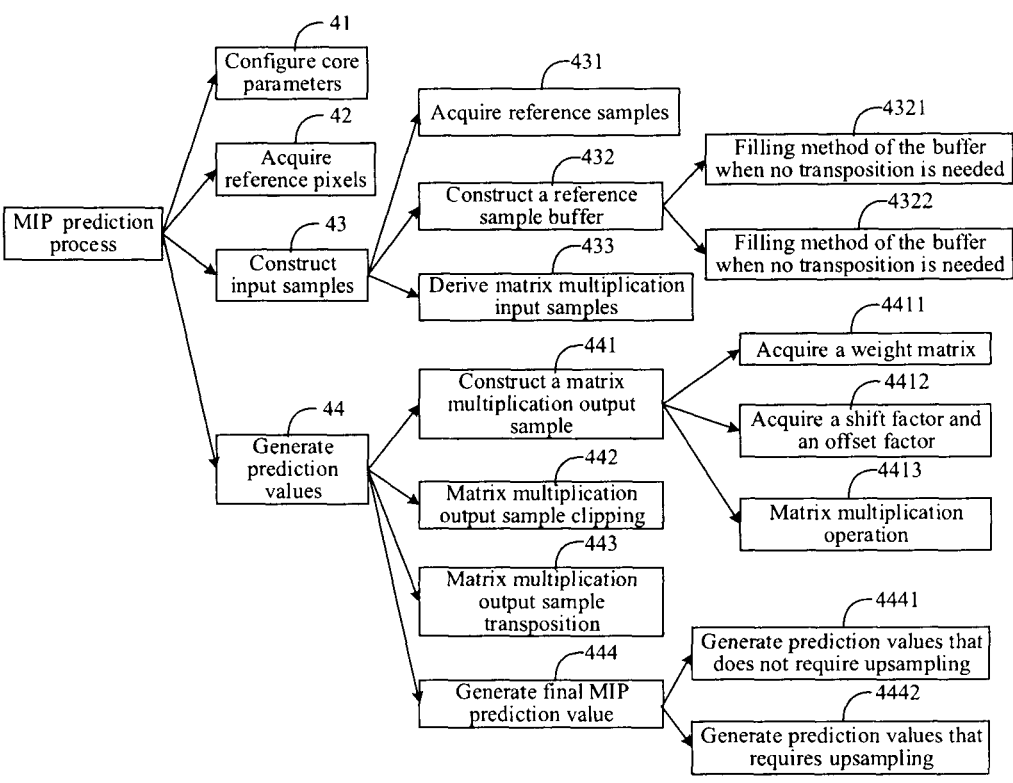
FIG. 4 illustrates a flowchart of a MIP prediction process according to embodiments of the disclosure.

In some embodiments of the disclosure, as illustrated in FIG. 4, the MIP prediction process may be divided into four operations: configuring core parameters 41, acquiring reference pixels 42, constructing input samples 43, and generating prediction values 44. Regarding configuring the core parameters 41, current blocks in the picture may be divided into three categories according to sizes of the current blocks, and mipSizeId may be used to denote the category of a current block. Moreover, for different categories of the current blocks, the number of reference sample points and the number of sample points output by matrix multiplication are different. Regarding acquiring the reference pixels 42, when a current block is predicted, upper and left adjacent blocks of the current block are both encoded blocks. The reference pixels in the MIP technique are reconstructed values of the upper adjacent row of pixels and the left adjacent column of pixels of the current block, and a process of acquiring adjacent reference pixels at the upper side (denoted by refT) and adjacent reference pixels are the left side (denoted by refT) of the current block is the process of acquiring the reference pixels. Regarding constructing the input samples 43, this operation is used for obtaining the input of matrix multiplication, and may mainly include: acquiring reference samples 431, constructing a reference sample buffer 432, and deriving matrix multiplication input samples 433. The process of acquiring the reference samples is a down-sampling process, and the process of constructing the reference sample buffer 432 may include a filling method 4321 of the buffer when no transposition is needed and a filling method 4322 of the buffer when transposition is needed. Regarding generating the prediction values 44, this operation is used to acquire MIP prediction values of the current block, and may mainly include: constructing a matrix multiplication output sample block 441, matrix multiplication output sample clipping 442, matrix multiplication output sample transposition 443, and generating final MIP prediction values 444. Constructing the matrix multiplication output sample block 441 may further include acquiring a weight matrix 4411, acquiring a shift factor and an offset factor 4412, and matrix multiplication operation 4413, and generating the final MIP prediction values 444 may further include generating prediction values that does not require upsampling 4441 and generating prediction values that requires upsampling 4442. As such, after the four operations, the intra prediction values of the current block can be obtained.

As such, after determining the intra prediction values of the current block, difference values between real pixel values and the intra prediction values of the current block are calculated, and the obtained difference values are considered as a prediction error which is subsequently transformed.

It is to be noted that, during MIP prediction, the MIP parameter also needs to be determined.

In some embodiments, the MIP parameter may include a MIP transposition indication parameter (which may be denoted by isTransposed). The value of the MIP transposition indication parameter is used for indicating whether to transpose a sample point input vector used in the MIP mode.

In the MIP mode, according to reference sample values corresponding to adjacent reference pixels at the left side of the current block and reference sample values corresponding to adjacent reference pixels at the upper side of the current block, an adjacent reference sample set may be obtained. After the adjacent reference sample set is obtained, an input reference sample set may be constructed, namely the sample point input vector used in the MIP mode. However, the way of constructing the input reference sample set at an encoder side is different from that in a decoder side, and the difference is related to the value of the MIP transposition indication parameter. During encoding, the MIP transposition indication parameter is calculated by the encoder; and during decoding, the MIP transposition indication parameter may be decoded from the bitstream.

It is to be noted that, the decoder obtains the MIP transposition indication parameter by decoding. When the value of the MIP transposition indication parameter is 0, the reference sample values corresponding to adjacent reference pixels at the upper side of the current block may be stored before the reference sample values corresponding to adjacent reference pixels at the left side of the current block in a buffer; in this case, no transposition is needed. That is to say, there is no need to transpose the sample point input vector used in the MIP mode, and the buffer may be directly determined as the input reference sample set. When the value of the MIP transposition indication parameter is 1, the reference sample values corresponding to adjacent reference pixels at the upper side of the current block may be stored after the reference sample values corresponding to adjacent reference pixels at the left side of the current block in the buffer. In this case, transposition needs to be performed for the buffer. That is to say, the sample point input vector used in the MIP mode needs to be transposed, and the transposed buffer may be determined as the input reference sample set. As such, after obtaining the input reference sample set, the input reference sample set may be used in the process of determining intra prediction values corresponding to the current block in the MIP mode.

S103, a first transform parameter of the current block is determined based on the first prediction values of the current block or the first-type intra prediction mode parameter of the current block.

In the embodiments of the disclosure, the decoder may determine the first transform parameter of the current block based on the first prediction values of the current block. The decoder may also determine the first transform parameter of the current block based on the first-type intra prediction mode parameter of the current block. This is not limited in the disclosure.

In some embodiments of the disclosure, the implementation that the decoder determines the first transform parameter of the current block based on the first prediction values of the current block may include following.

S1, a first index of a second-type intra prediction mode of the current block is determined based on the first prediction values of the current block.

S2, the first transform parameter of the current block is determined based on the first index of the second-type intra prediction mode of the current block.

In the embodiments of the disclosure, the decoder may determine the first index of the second-type intra prediction mode of the current block based on the first prediction values of the current block. The second-type intra prediction mode includes at least one of: a planar mode, a direct current mode, or an angular intra prediction mode. Then the decoder may determine the first transform parameter of the current block based on the first index of the second-type intra prediction mode of the current block.

In the embodiments of the disclosure, the first transform parameter serves as the basis for determining the second transform parameter namely a transform kernel index parameter (referring to a transform coefficient matrix index) and a scanning sequence parameter of transform parameters.

That is to say, the decoder may map a non-traditional intra prediction mode to a traditional intra prediction mode, and determine the first transform parameter of the current block through the first index of the traditional intra prediction mode, so that the second transform parameter to be subjected to parameter transform may be selected for the current block in the non-traditional intra prediction mode in a flexible way corresponding to the traditional intra prediction mode. The applicability of non-traditional intra prediction mode (the first-type intra prediction mode) is improved, the encoding efficiency is also improved; and picture quality in video can also be improved.

It is to be noted that, in the embodiments of the disclosure, the first prediction values may be final prediction values obtained through intra prediction with the first-type intra prediction mode, or may be intermediate prediction values obtained during intra prediction with the first-type intra prediction mode.

Exemplarily, for the MIP mode, the first prediction values may be final prediction values obtained after upsampling in MIP prediction, or may be intermediate prediction values obtained before upsampling in MIP prediction, which is not limited in the disclosure.

In some embodiments of the disclosure, the decoder may set the first transform parameter of the current block to be equal to the first index of the second-type intra prediction mode of the current block.

In some embodiments of the disclosure, the implementation of the operation S1 includes following.

S201, an index set of second-type intra prediction modes corresponding to the first prediction values is determined based on the first prediction values of the current block.

S202, the first index of the second-type intra prediction mode of the current block is determined based on the index set of the second-type intra prediction modes corresponding to the first prediction values. The index set of the second-type intra prediction modes stores accumulative weight values corresponding to a portion or all of admissible values of indexes of the second-type intra prediction modes.

In the embodiments of the disclosure, the decoder may map the first prediction values to second-type intra prediction modes, thus obtaining the index set of the second-type intra prediction modes, and may then determine the first index of the second-type intra prediction mode used for the current block from the index set of the second-type intra prediction modes.

It is to be noted that, the index set of the second-type intra prediction modes may store accumulative weight values corresponding to a portion or all of admissible values of indexes of one or more second-type intra prediction modes. If the index set of the second-type intra prediction modes stores accumulative weight values corresponding to a portion or all of admissible values of indexes of multiple second-type intra prediction modes, the first index of the second-type intra prediction mode of the current block may be selected from the accumulative weight values corresponding to indexes of multiple second-type intra prediction modes.

In some embodiments of the disclosure, for each of a portion or all of the first prediction values, the decoder determines a gradient value in a horizontal direction and a gradient value in a vertical direction of a respective sample point, and the decoder determines the index set of the second-type intra prediction modes corresponding to the first prediction values based on gradient values in the horizontal direction and gradient values in the vertical direction of sample points corresponding to the portion or all of the first prediction values.

Exemplarily, a MIP prediction value is used. Through different analysis methods, the MIP prediction value is mapped to a traditional intra prediction mode by calculating gradient information corresponding to the MIP prediction value. For example, the traditional intra prediction mode is derived according to the gradient information, and a transform set and a scanning sequence used in LFNST are selected according to the derived traditional intra prediction mode.

It is to be noted that, the decoder can determine the second index of a corresponding second-type intra prediction mode for each sample point; and after the determination is completed for sample points corresponding to a portion or all prediction values of the first prediction values, the index set of the second-type intra prediction modes can be obtained.

In some embodiments of the disclosure, the process of determining a second index of a second-type intra prediction mode is consistent for all sample points. The operation that the decoder determines the index set of the second-type intra prediction modes corresponding to the first prediction values based on gradient values in the horizontal direction and gradient values in the vertical direction of the sample points corresponding to the portion or all of the first prediction values includes following operations (1) and (2) for a sample point.

(1) For each of the sample points, the decoder determines a gradient angle value of the sample point according to the gradient value in the horizontal direction and the gradient value in the vertical direction of the sample point. The decoder determines a second index of a second-type intra prediction mode corresponding to the gradient angle value of the sample point value according to the gradient angle value of the sample point. The decoder updates an accumulative weight value corresponding to the determined second index of the second-type intra prediction mode in the index set of the second-type intra prediction modes.

In the embodiments of the disclosure, the decoder determines the gradient angle value of the sample point based on the gradient value in the horizontal direction, the gradient value in the vertical direction of the sample point, and a preset function.

In a first implementation, the preset function is an arc-tangent function, and the arc-tangent function is a ratio of the gradient value in the horizontal direction of the sample point to the gradient value in the vertical direction of the sample point.

Exemplarily, the preset function is as illustrated in formula (1):

$$\theta = a\tan\left(\frac{G_y}{G_x}\right) \tag{1}$$

$G_x$ and $G_y$ are the gradient value in the horizontal direction and the gradient value in the vertical direction respectively, and 0 is the gradient angle value.

In some embodiments of the disclosure, the decoder processes, based on the arc-tangent function, the ratio of the gradient value in the horizontal direction of the sample point to the gradient value in the vertical direction of the sample point, to determine the gradient angle value of the sample point.

In a second implementation, the preset function is a second mapping table of the gradient angle value of the sample point and the gradient value in the horizontal direction and the gradient value in the vertical direction of the sample point.

In some embodiments of the disclosure, the decoder inputs, into the second mapping table, the gradient value in the horizontal direction and the gradient value in the vertical direction of the sample point or a ratio of the gradient value in the horizontal direction of the sample point to the gradient value in the vertical direction of the sample point, to output the gradient angle value of the sample point.

It is to be noted that, with the second mapping table known, the gradient angle value can be determined through the second mapping table, the gradient value in the horizontal direction and the gradient value in the vertical direction of the sample point. The second mapping table may include the correspondence between the gradient value in the horizontal direction and the gradient value in the vertical direction of sample points, and the gradient angle value, or may include correspondence between the ratio of the gradient value in the horizontal direction to the gradient value in the vertical direction of the sample point, and the gradient angle value.

In the embodiments of the disclosure, after determining the gradient angle value, the decoder can determine the second index of the second-type intra prediction mode of the sample point according to the gradient angle value of the sample point.

In some embodiments of the disclosure, the implementation that the decoder determines the second index of the second-type intra prediction mode corresponding to the gradient angle value of the sample point value according to the gradient angle value of the sample point includes following: A second-type intra prediction mode index value corresponding to an angular intra prediction direction having a minimum included angle with a direction indicated by the gradient angle value is determined among angular intra prediction directions indicated by the portion or all of admissible values of the indexes of the second-type intra prediction modes. The second index of the second-type intra prediction mode corresponding to the gradient angle value is set to be the second-type intra prediction mode index value.

It is to be noted that, an array may be used in the decoder to store the accumulative weight values corresponding to the portion or all of admissible values of the indexes of the second-type intra prediction modes. Each data in the array is an accumulative weight value corresponding to an admissible value of a second-type intra prediction mode.

The decoder firstly finds out an angular intra prediction direction closest to a direction indicated by the gradient angle value, and then determines a second-type intra prediction mode corresponding to the angular intra prediction direction. An index value of this second-type intra prediction mode is taken as the second index of the second-type intra prediction mode of the gradient angle value.

In some embodiments of the disclosure, the implementation that the decoder determines the second index of the second-type intra prediction mode corresponding to the gradient angle value of the sample point value according to the gradient angle value of the sample point includes following: The second index of the second-type intra prediction mode corresponding to the gradient angle value of the sample point is determined according to a preset third mapping table between gradient angle values and second-type intra prediction mode indexes. The third mapping table represents correspondences between gradient angle values of different values or in different value ranges and the second-type intra prediction mode indexes.

In some embodiments of the disclosure, after determining the second index of a corresponding second-type intra prediction mode for each sample point, the decoder may update an accumulative weight value corresponding to the determined second index of the second-type intra prediction mode in the index set of the second-type intra prediction modes. That is to say, each time of having determined the second index of a sample point, the decoder may increment, by a set numeric value, the accumulative weight value corresponding to the determined second index of the second-type intra prediction mode in the index set of the second-type intra prediction modes. As such, after all sample points are processed, the index set of the second-type intra prediction modes corresponding to the first prediction values can be obtained.

In some embodiments of the disclosure, the set numeric value equals 1. Alternatively, the set numeric value equals a sum (G) of an absolute value of the gradient value in the horizontal direction of the sample point and an absolute value of the gradient value in the vertical direction of the sample point. This is not limited in the embodiments of the disclosure.

Exemplarily, as illustrated in formula (2), G is:

$$G = |G_x| + |G_y| \qquad (2)$$

(2), for each of the sample points, the decoder determines a gradient direction, a first gradient magnitude and a mode partition of the sample point according to the gradient value in the horizontal direction and the gradient value in the vertical direction of the sample point. The decoder determines the second index of the second-type intra prediction mode according to the gradient direction, the first gradient magnitude and the mode partition of the sample point. The decoder updates an accumulative weight value corresponding to the determined second index of the second-type intra prediction mode in the index set of the second-type intra prediction modes.

In some embodiments of the disclosure, the decoder determines the first gradient magnitude of the sample point based on the gradient value in the horizontal direction (gHor[x][y]) and the gradient value in the vertical direction (gVer[x][y]) of the sample point. The decoder performs second-type intra prediction mode partitioning for the sample point based on the gradient value in the horizontal direction and the gradient value in the vertical direction of the sample point, to determine a horizontal region index (signH[x][y]), a vertical region index (signV[x][y]) and a gradient magnitude index (HgV[x][y]) of the sample point. The decoder determines the mode partition of the sample point (region[x][y]) based on the horizontal region index, the vertical region index and the gradient magnitude index of the sample point. The decoder determines the gradient direction of the sample point (HgV[x][y]==1?) based on the gradient magnitude index of the sample point.

In some embodiments of the disclosure, the implementation that the decoder determines the second index of the second-type intra prediction mode according to the gradient direction, the first gradient magnitude and the mode partition of the sample point includes following:

The decoder determines a gradient offset ratio (grad[x][y]) of the sample point according to the gradient direction of the sample point. The decoder maps the gradient offset ratio of the sample point into a preset mode offset range, to obtain an intra prediction mode index offset of the sample point (angIdx[x][y]). The decoder determines a target second-type intra prediction mode corresponding to the mode partition of the sample point according to a preset fourth mapping table of mode partitions and mode indexes. The decoder determines the second index of the second-type intra prediction mode of the sample point by combining the target second-type intra prediction mode and the intra prediction mode index offset.

In some embodiments of the disclosure, after determining the second index of a corresponding second-type intra prediction mode for each sample point, the decoder may update an accumulative weight value corresponding to the determined second index of the second-type intra prediction mode in the index set of the second-type intra prediction modes. That is to say, each time of having determined the second index of a sample point, the decoder may increment, by a set numeric value, the accumulative weight value corresponding to the determined second index of the second-type intra prediction mode in the index set of the second-type intra prediction modes. As such, after all sample points are processed, the index set of the second-type intra prediction modes corresponding to the first prediction values can be obtained.

In the embodiments of the disclosure, the implementation that the decoder updates an accumulative weight value corresponding to the determined second index of the second-type intra prediction mode in the index set of the second-type intra prediction modes includes following: The decoder increments, by a set numeric value, the accumulative weight value corresponding to the determined second index of the second-type intra prediction mode in the index set of the second-type intra prediction modes.

The set numeric value equals 1, or the set numeric value equals a sum (G) of an absolute value of the gradient value in the horizontal direction of the sample point and an absolute value of the gradient value in the vertical direction of the sample point, which is not limited in the embodiments of the disclosure.

Exemplarily, taking the MIP mode as an example, prediction values (that is, first prediction values) of the MIP mode are analyzed, and a traditional intra prediction mode is derived from the prediction values of the MIP mode. A predModeIntra is mapped to the traditional intra prediction mode to obtain a first index, that is, a first transform parameter equal to the first index is obtained.

In the embodiments of the disclosure, the decoder may analyze the gradients of the MIP prediction values, extract a direction with the maximum gradient value, and matches the direction to a traditional intra prediction mode. The mapping process is divided into two operations: obtaining the prediction pixels of the MIP mode, and deriving the traditional intra prediction mode by using gradients. The mapping process includes: obtaining the prediction pixels (namely, the sample points of the first prediction values) of the MIP mode, and deriving the traditional intra prediction mode by using gradients.

The process that the decoder determines the index set of the second-type intra prediction modes corresponding to the first prediction values based on the first prediction values of the current block is as follows.

In the embodiment of the disclosure, in acquiring the prediction values of the MIP mode, the decoder may acquire the prediction values of the MIP mode according to the position and size of a MIP transform unit (current block). When the residuals of the current transform unit are transformed and quantized, the prediction of the current transform unit has been completed; at this time, the prediction values may be directly acquired according to the position and size of the MIP transform unit. An achievable way is to obtain the final prediction values after completing matrix multiplication and upsampling in the MIP mode, and another achievable way is to obtain the prediction values before upsampling in the MIP mode.

In the embodiments of the disclosure, the process that the decoder derives the traditional intra prediction mode by using the gradients is: with analyzing the final prediction pixels of the MIP mode as an example, calculating the vertical gradient (a gradient value in the vertical direction) and the horizontal gradient (a gradient value in the horizontal direction) of all or some prediction pixels of the final prediction pixels of the MIP mode, and mapping a direction of a maximum gradient (gradient angle value) to a traditional intra prediction mode.

In the embodiments of the disclosure, by analyzing the prediction values before upsampling in the MIP mode, the MIP prediction mode is mapped to a traditional intra prediction mode, and a transform set and a scanning sequence to be used in LFNST are selected according to the mapped traditional intra prediction mode.

Exemplarily, one achievable way is to calculate the horizontal gradient and the vertical gradient of the final MIP prediction value by a Sobel operator. The Sobel operator formula (3) is shown below, where $G_x$ is used to calculate the horizontal gradient, and $G_y$ is used to calculate the vertical gradient.

$$G_x = \begin{bmatrix} -1 & 0 & 1 \\ -2 & 0 & 2 \\ -1 & 0 & 1 \end{bmatrix} \quad (3)$$

and $$G_y = \begin{bmatrix} -1 & -2 & -1 \\ 0 & 0 & 0 \\ 1 & 2 & 1 \end{bmatrix}$$

The process of using Sobel to perform gradient analysis and using MIP prediction values to derive a traditional intra prediction mode is introduced in detail hereinafter.

The following parameter settings and concepts are introduced at first:

A sample point of a prediction value of the MIP mode is: p[x][y], where x=0 . . . nTbW−1, and y=0 . . . nTbH−1. nTbW represents the width of the current MIP transform unit, and nTbH represents the height of the current MIP transform unit.

The decoder obtains a traditional intra prediction mode IntraPredModeD (i.e., a second-type intra prediction mode), where IntraPredModeD is between[0, 66].

Some rules as follows need to be set:

It is set that mapHgV={{2, 1}, {1, 2}} and mapVgH={{3, 4}, {4, 3}}, that is, fourth regions are divided in each of the horizontal direction and the vertical direction.

It is set that angTable={0, 2048, 4096, 6144, 8192, 12288, 16384, 20480, 24576, 28672, 32768, 36864, 40960, 47104, 53248, 59392, 65536}, that is, 16 modes corresponding to different angle offsets are set. It is set that the index corresponding to each value of angTable is [0-15].

It is set that angOffset={18, 18, 50, 50}.

It is set that HoG corresponding to[0, 66] is an array containing the gradient magnitude of each traditional intra prediction mode. At the beginning of this process, all values in all HOG arrays are initialized to 0.

For each prediction pixel p[x][y], with x=1 . . . nTbW−2, and y=1 . . . nTbH−2, the calculation process is as follows:

A horizontal gradient is calculated: gHor[x][y]=p[x−1][y−1]+2.p[x−1][y]+p[x−1][y+1]−p[x+1][y−1]−2.p[x+1][y]−p[x+1][y+1].

A vertical gradient is calculated: gVer[x][y]=p[x−1][y−1]+2.p[x][y−1]+p[x+1][y−1]−p[x−1][y+1]−2p[x][y+1]−p[x+1][y+1]].

A gradient magnitude is calculated: iAmp[x][y]=abs (gHor[x][y])+abs(gVer[x][y]).

A horizontal region index is calculated: signH[x][y] =gHor[x][y]<0?1:0.

A vertical region index is calculated: signV[x][y]=gVer [x][y]<0?1:0.

A gradient magnitude index is calculated: HgV[x][y]= (abs(gHor[x][y])>abs(gVer[x][y])?1:0).

A mode partition is determined by calculation: region[x] [y]=(HgV[x][y]==1?mapHgV[signH[x][y]][sign V[x][y]]: map VgH[signH[x][y]][sign V[x][y]]). Namely a mode partition of the sample point is determined based on the horizontal region index, the vertical region index and the gradient magnitude index of the sample point.

A gradient offset ratio is calculated: grad[x][y]=(HgV[x] [y]==1?abs(gVer[x][y])/abs(gHor[x][y]):abs((gHor[x][y]/ gVer[x][y])). Namely, a gradient offset ratio of the sample point is determined according to the gradient direction of the sample point.

grad[x][y]=round (grad[x][y]*(1<<16)) is calculated, and an intra prediction mode index offset is calculated: angIdx [x][y]=argmin$_i$(abs(angTable[i]−grad[x][y])). Namely, the gradient offset ratio of the sample point is mapped into a preset mode offset range, to obtain an intra prediction mode index offset of the sample point.

An index of a second-type intra prediction mode is calculated: ipm[x][y]=angOffset[region[x][y]] (the value may be 18 or 50)+angIdx[x][y]. Namely, a target second-type intra prediction mode (angOffset[region[x][y]]) corresponding to the mode partition of the sample point is determined according to a preset fourth mapping table of mode partitions and mode indexes. The second index (ipm [x][y]) of the second-type intra prediction mode of the sample point is determined by combining the target second-type intra prediction mode and the intra prediction mode index offset.

It is set that HOG[ipm[x][y]]=HOG[ipm[x][y]] (accumulated weight value)+iAmp[x][y] (set numeric value).

In this way, the second-type intra prediction mode corresponding to each sample point, and the second index of the second-type intra prediction mode: HOG[ipm[x][y]] are obtained.

In some embodiments of the disclosure, for S202, the implementation that the decoder may determine, based on the index set of the second-type intra prediction modes corresponding to the first prediction values, the first index of the second-type intra prediction mode of the current block includes following:

The decoder sets the first index of the second-type intra prediction mode of the current block to be a second index of a second-type intra prediction mode corresponding to a maximum accumulative weight value in the index set of the second-type intra prediction modes corresponding to the first prediction values. Alternatively, the decoder sets the first index of the second-type intra prediction mode of the current block to be a second index of a second-type intra prediction mode with a minimum accumulative weight value in the index set of the second-type intra prediction modes corresponding to the first prediction values. This is not limited in the embodiments of the disclosure.

It is to be noted that, the decoder obtains the index set of the second-type intra prediction modes of the first prediction values through a portion or all of the first prediction values, and the decoder determines the second index of the second-type intra prediction mode corresponding to a maximum accumulative weight value in the index set of the second-type intra prediction modes of the first prediction values as the first index of the second-type intra prediction mode of the current block.

Exemplarily, the traditional intra prediction mode of IntraPredModeD is set as $\text{argmax}_i(\text{HoG}[i])$.

where $\text{argmax}_i(\text{L}[i])$, i=0, . . . , N, an index between 0 and N maximizing L is returned (or returning a smaller index if there are multiple maximums).

$\text{argmin}_i(\text{L}[i])$, i=0, . . . , N, an index between 0 and N minimizing L is returned (or returning a smaller index if there are multiple minimums).

Finally, predModeIntra is mapped to IntraPredModeD.

It is to be noted that, when all elements in HOG have zero amplitude, the value of predModeIntra is updated and set to an index number indicating the PLANAR mode.

In some embodiments of the disclosure, the decoder may further determine second-type intra prediction values of the current block according to a candidate second-type intra prediction mode. The candidate second-type intra prediction mode includes one or more of: a planar mode, a direct current mode, or an angular intra prediction mode. The first index of the second-type intra prediction mode of the current block is determined based on the first intra prediction values and the second-type intra prediction values.

Exemplarily, the decoder calculates a difference between a prediction value of a MIP mode and prediction values of a traditional intra prediction modes, and selects a traditional intra prediction mode with a prediction value closest to the prediction value of the MIP mode, and selects a transform set and a scanning sequence to be used in LFNST according to the selected intra prediction mode.

In some embodiments of the disclosure, the decoder determines a first prediction error of the first intra prediction values and the second-type intra prediction values. In response to that the first prediction error satisfies a first preset condition, the decoder determines an index value corresponding to the candidate second-type intra prediction mode as the first index of the second-type intra prediction mode of the current block.

The decoder may determine the first prediction error of the first intra prediction values and the second-type intra prediction values in following two ways:

Approach I: the first prediction error of the first prediction values and the second-type intra prediction values is determined according to a first error criterion.

The first prediction error is one of: a sum of absolute errors (SAD), a sum of squared errors (SSD), a mean absolute error (MAD) or a mean square error; and the first preset condition is that the first prediction error reaches a minimum value.

Approach II: the first prediction error of the first prediction values and the second-type intra prediction values is determined according to a second error criterion;

The second prediction error is one of: a signal to noise ratio (SNR), or a peak signal to noise ratio (PSNR); and the first preset condition is that the first prediction error reaches a maximum value.

In some embodiments of the disclosure, the implementation that the decoder determines the first transform parameter of the current block based on the first-type intra prediction mode parameter of the current block may include following. A first index of a second-type intra prediction mode of the current block is determined based on the first-type intra prediction mode parameter. The first transform parameter of the current block is determined based on the first index of the second-type intra prediction mode.

In the embodiments of the disclosure, the decoder may determine the first index of the second-type intra prediction mode of the current block based on the first-type intra prediction mode parameter in following two ways:

Approach I:

The decoder determines the first index of the second-type intra prediction mode of the current block according to a first preset mapping relationship of first-type intra prediction mode parameters and second-type intra prediction mode indexes.

The first-type intra prediction mode parameter includes a first-type intra prediction mode index, and the first preset mapping relationship represents correspondences between first-type intra prediction mode indexes and second-type intra prediction mode indexes. The decoder determines the first index of the second-type intra prediction mode from the first preset mapping relationship according to the first-type intra prediction mode index.

Approach II:

The decoder determines the first index of the second-type intra prediction mode of the current block based on a first-type intra prediction mode weight matrix indicated by the first-type intra prediction mode parameter.

In some embodiments of the disclosure, the decoder determines a gradient parameter of the first-type intra prediction mode weight matrix. The decoder determines the first index of the second-type intra prediction mode of the current block based on the gradient parameter of the first-type intra prediction mode weight matrix.

Exemplarily, by analyzing a weight matrix of the MIP mode, the MIP prediction mode is mapped to a traditional intra prediction mode, and a transform set and a scanning sequence to be used in LFNST is selected according to the mapped traditional intra prediction mode.

In some embodiments of the disclosure, for S2, the implementation that the decoder determines the first transform parameter of the current block based on the first index of the second-type intra prediction mode includes following:

the decoder performs wide angle mapping on the first index of the second-type intra prediction mode, to determine a wide-angle prediction mode index; and determines the first transform parameter based on the wide-angle prediction mode index.

It is to be noted that, for the transform unit using the first-type intra prediction mode, the decoder maps the first intra prediction mode to the traditional intra prediction mode (the second-type intra prediction mode) by analyzing the first prediction values of the first-type intra prediction mode, performs wide angle mapping on the mapped traditional intra prediction mode, and then selects the transform set (transform matrix) and the scanning sequence according to the traditional intra prediction mode (i.e., the determined first transform parameter) having subjected to the wide angle mapping.

Exemplarily, for a transform unit using the MIP prediction mode, the MIP mode is mapped to a traditional intra prediction mode by analyzing prediction values of the MIP mode; wide angle mapping is performed on the mapped traditional intra prediction mode, and then a transform set (transform matrix) and a scanning sequence are selected according to the traditional intra prediction mode having subjected to the wide angle mapping In the embodiments of the disclosure, description is made with the LFNST technique being used in the MIP mode as an example, and it should be noted that the disclosure is also applicable to scenarios where an extended LFNST technique is used.

It is to be noted that, not any current block can subject to LFNST. LFNST can be performed on the current block only if the current block satisfies the following conditions at the same time. The conditions include: (a) both the width and height of the current block are greater than or equal to 4; (b) both the width and height of the current block are smaller than or equal to a maximum size of the transform unit; (c) a prediction mode of the current block or a current coding block is an intra prediction mode; (d) primary transform of the current block is two-dimensional forward primary transform (DCT2) in both the horizontal and vertical directions; (c) the intra prediction mode of the current block or the current coding block is a non-MIP mode, or the prediction mode of the transform unit is the MIP mode and both the width and height of the transform unit are greater than or equal to 16. That is to say, the current block in the embodiments of the disclosure should satisfy the five conditions at the same time.

Further, when it is determined that LFNST can be performed for the current block, an LFNST transform kernel used for the current block also needs to be determined. There are four transform kernel candidate sets in LFNST, which may include set0, set1, set2 and set3. According to coding parameters of the current block or the current coding block, the selected transform kernel candidate set may be derived implicitly. For example, in the present H.266/VVC, which one of the four transform kernel candidate sets is to be used can be determined according to the intra prediction mode of the current block.

In the embodiments of the disclosure, after acquiring the intra prediction mode of the current block, an initial value (which may be denoted by predModeIntra) of the intra prediction mode may be determined, which is calculated in the following formula:

$$PredModeIntra=(cIdx==0)?IntraPredModedY[xTbY] \qquad (4)$$

$$[yTbY]:IntraPredModedC[xTbY][yTbY]$$

A colour component indicator (which may be denoted by cIdx) is used to indicate a luma component or a chroma component of the current block. Here, if a luma component is predicted for the current block, then cIdx is equal to 0; and if a chroma component is predicted for the current block, then cIdx is equal to 1. Additionally, (xTbY, yTbY) are coordinates of a sample point at the upper left corner of the current block. IntraPredModeY[xTbY][yTbY] is an intra prediction mode of the luma component, and IntraPredModeC[xTbY][yTbY] is an intra prediction mode of the chroma component.

It is to be noted that the value of the LFNST index number may be used to indicate whether LFNST is used for the current block, and to indicate the index number of the LFNST transform kernel in the LFNST transform kernel candidate set. Specifically, after the LFNST index number is parsed out, when the value of the LFNST index number is equal to 0, it indicates that no LFNST is used for the current block. When the value of the LFNST index number is greater than 0, it indicates that LFNST is used for the current block, and the index number of the transform kernel is equal to the value of the LFNST index number, or the value of the LFNST index number subtracted by 1.

It is also to be noted that, at the decoder side, the input data of the LFNST may include: a luma position (xTbY, yTbY) of the current transform unit, a width nTbW of the current block, a height nTbH of the current block, whether the current block is a luma component or a chroma component cIdx, and coefficients d[x][y] of the current transform unit after inverse quantization (scaling), x=0, 1, . . . , nTbW−1, and y=0, 1, . . . , nTbH−1. The output data of the LFNST may include a primary transform coefficient d'[x][y] generated by a secondary transform coefficient after the LFNST, x=0, 1 . . . , nLfnstSize−1, and y=0, 1 . . . , nLfnstSize−1.

In H.266/VVC, intra prediction modes may be divided into traditional intra prediction modes and non-traditional intra prediction modes. For the non-traditional intra prediction mode, the information indicated by the value of predModeIntra is as follows:

If the prediction mode of the current block is the CCLM mode, the value of predModeIntra may be INTRA_LT_CCLM, INTRA_L_CCLM, or INTRA_T_CCLM (81, 82, and 83 in VVC, respectively).

If the prediction mode of the current block is the MIP mode, the value of predModeIntra may be the used MIP mode index number.

If the prediction mode of the current block is a traditional intra prediction mode, the value of predModeIntra may be [0, 66].

In addition, if the prediction mode of the current block is the CCLM mode or the MIP mode, the value of predModeIntra may be set in the following way:

(1) When the prediction mode of the current block is the CCLM mode, if the mode of a center luma block of a corresponding luma position of the current block (such as a chroma block) is the MIP mode, that is, intra_mip_flag[xTbY+nTbW/2][yTbY+nTbH/2] is 1, the value of predModeIntra is set to an index number indicating the PLANAR mode (that is, 0);

if the mode of the center luma block of the corresponding luma position of the current block (such as a chroma block) is the IBC mode or the Palette mode, the value of predModeIntra is set to an index number indicating the direct current (DC) mode (that is, 0);

otherwise, the value of predModeIntra is set to the value IntraPredModeY [xTbY+nTbW/2][yTbY+nTbH/2] of the mode index number of the center luma block of the corresponding luma position of the current block (such as the chroma block).

(2) When the prediction mode of the current block is the MIP mode,

If intra_mip_flag[xTbY][yTbY] is 1 and cIdx is 0, it indicates that the prediction mode of the current transform unit is the MIP mode; at this time, the prediction values of the MIP mode are analyzed, a traditional intra prediction mode is derived from the prediction values of the MIP mode, and predModeIntra is mapped to the traditional intra prediction mode.

For the traditional intra prediction mode, wide angle mapping can be performed according to the size of the current block, to extend the traditional intra prediction mode [0, 66] to [−14, 80]. The mapping process is as follows:

Firstly, a width-to-height ratio factor (which may be denoted by whRatio) is calculated, as shown below:

$$whRatio = Abs(Log2)(nTbW \mathbin{/} nTbH)) \qquad (5)$$

For a non-square current block (i.e., nTbW is not equal to nTbH), predModeIntra may be modified as follows in this case: if nTbW is greater than nTbH, predModeIntra is greater than or equal to 2, and predModeIntra is less than ((whRatio>1?(8+2)×whRatio): 8), then predModeIntra= (predModeIntra+65); otherwise, if nTbW is less than nTbH, and predModeIntra is less than or equal to 66, and predModeIntra is greater than ((whRatio>1? (60−2×whRatio): 60), then predModeIntra=(predModeIntra−67).

It may be understood that, for the current block encoded using the first-type intra prediction mode (such as Matrix-based Intra Prediction (MIP)), since the first prediction values or the first-type intra prediction mode parameter of the current block is introduced in low-frequency non-separable transform (LFNST), the selection of a transform kernel or a transform matrix (corresponding to the second transform parameter) in the transform technique is more flexible. Thus, not only the applicability of non-traditional intra prediction mode (the first-type intra prediction mode) is improved, but also decoding efficiency is improved; and picture quality in video can also be improved.

S104, a second transform parameter for transforming the current block is determined based on the first transform parameter.

In the embodiments of the disclosure, the decoder may determine the second transform parameter corresponding to the first transform parameter according to a preset first mapping table between first transform parameters and second transform parameters.

The second transform parameter includes at least one of: a transform kernel index parameter (referring to the transform coefficient matrix index), or a scanning sequence parameter of transform parameters. The transform kernel index parameter indicates a transform kernel to be used in decoding the transform parameters of the current block, the scanning sequence parameter indicates a scanning sequence of the transform parameters of the current block, and the scanning sequence includes a horizontal sequence and a vertical sequence.

It is to be noted that, the transform kernel index parameter refers to the transform coefficient matrix index, and may be obtained directly from the bitstream; or the decoding end may determine a transform set (i.e., a transform kernel candidate set), and then acquire, from the bitstream, an index number with a transform kernel within the transform kernel candidate set.

In the embodiments of the disclosure, description is made with the LFNST technique is used in the MIP mode as an example, and it should be noted that the disclosure is also applicable to scenarios where an extended LFNST technique is used.

In the present H.266/VVC, according to the value of predModeIntra and Table 1 (the first mapping table), the value of the LFNST index number (which may be denoted by SetIdx) can be determined. The specific values of the LFNST index number are as shown in Table 1. The value of the LFNST index number is set to indicate that LFNST is used for the current block, and to indicate the index number of the LFNST transform kernel in the LFNST transform kernel candidate set. Generally, the LFNST transform set includes four transform kernel candidate sets (set0, set1, set2, set3) which correspond to values of SetIdx 0, 1, 2, and 3 respectively.

TABLE 1

| predModeIntra | SetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

In the embodiments of the disclosure, the LFNST transform kernel candidate set may be first determined according to the MIP parameter or the first prediction values, then the LFNST index number may be obtained from the bitstream, and the LFNST transform kernel used for the current block may be determined from the LFNST transform kernel candidate set based on the LFNST index number. Here, the transform matrix of the LFNST is a matrix of multiple fixed coefficients obtained by training, and the LFNST transform kernel candidate set includes two transform matrices (which can also be called LFNST transform kernels). After the LFNST transform kernel candidate set is determined, it is necessary to select an LFNST transform kernel from the LFNST transform kernel candidate set, that is, the transform matrix to be used in the LFNST for the current block is determined.

It is to be noted that in the extended LFNST, the number of LFNST transform kernel candidate sets is larger, and each LFNST transform kernel candidate set includes three transform matrixes, which will not be discussed in detail here.

When a first LFNST transform kernel (i.e., a first transform matrix) in the LFNST transform kernel candidate set is selected, Ifnst_idx is set to 1; and when a second LFNST transform kernel (i.e., a second transform matrix) in the LFNST transform kernel candidate set is selected, Ifnst_idx is set to 2.

It is to be noted that, after the MIP mode index is determined, the MIP mode index number may be converted into the LFNST intra prediction mode index number, that is, the value of the first index (which may be denoted by predModeIntra) of the second-type intra prediction mode. Then, according to the value of predModeIntra, a transform kernel candidate set is determined by selecting an LFNST transform kernel candidate set from multiple LFNST transform kernel candidate sets to determine the transform kernel candidate set. A transform kernel indicated by the LFNST index number is selected from the selected LFNST transform kernel candidate set, and is set as the LFNST transform kernel used for the current block.

Here, regarding the value of the LFNST index number, when the value of the LFNST index number is equal to 0, no LFNST is to be used. When the value of the LFNST index number is greater than 0, LFNST is used for the current block, and the index number of the transform kernel is equal to the value of the LFNST index number, or the value of the LFNST index number subtracted by 1.

S105, transform coefficients of the current block is transformed based on the second transform parameter, to determine residuals of the current block.

S106, reconstructed values of the current block are determined based on the residuals and the first prediction values.

In the embodiments of the disclosure, the transform coefficient includes a quantization coefficient.

In the embodiments of the disclosure, the decoder performs inverse quantization on the quantization coefficient, to obtain a first transform coefficient. The decoder transforms the first transform coefficient to obtain a first transform coefficient vector. The decoder transforms the first transform coefficient vector using a transform matrix indicated by the transform kernel index parameter, to obtain a second transform coefficient vector. The decoder transforms the second transform coefficient vector using the scanning sequence parameter of the transform parameters, to obtain a second transform coefficient. The first The decoder performs inverse transform on the second transform coefficient to determine the residuals of the current block.

After obtaining the residuals and the first prediction values, the decoder can determine the reconstructed values of the current block based on the residuals and the first prediction values.

Exemplarily, after the LFNST transform kernel is determined, the transform matrix selected for the current block can be obtained; at this time, the prediction error may be transformed.

Each transform matrix may further contain basic transform matrixes T of two sizes, for example 16×16 and 16×48. Regarding transform matrixes selected for TUs of 4 sizes, specifically: for a TU with a size 4×4, a 8×16 transform matrix is used, and the 8×16 transform matrix is from former 8×16 elements of a 16×16 basic transform matrix; for a TU with a size 4×N or N×4 (N>4), a 16×16 basic transform matrix is used; for a TU with a size 8×8, a 8×48 transform matrix is used, and the 8×48 transform matrix is from former 8×48 elements of a 16×48 basic transform matrix; and for a TU with a size greater than 8×8, a 16×48 basic transform matrix is used It is to be noted that in the present H.266/VVC, only the LFNST transform matrix (which may be denoted by TT) of the decoder side is stored, and the transform matrix used on the encoder side is the transposed matrix (which may be denoted by T) of the LFNST transform matrix.

It is also to be noted that, non-separable transform is applied by matrix multiplication in LFNST. In order to reduce the computational complexity and storage space as much as possible, a simplified non-separable transform technique is used in LFNST transform. The main idea of the simplified non-separable transform technique is to map an N-dimensional vector to an R-dimensional vector of a different space. Here, N/R (R<N) is a zoom factor. The transform matrix corresponding to the simplified non-separable transform technique is an R×N matrix as below:

$$T_{R \times N} = \begin{bmatrix} t_{11} & t_{12} & t_{13} & \cdots & t_{1N} \\ t_{21} & t_{22} & t_{23} & \cdots & t_{2N} \\ & \vdots & & \ddots & \vdots \\ t_{R1} & t_{R2} & t_{R3} & \cdots & t_{RN} \end{bmatrix} \quad (6)$$

Figure 5:
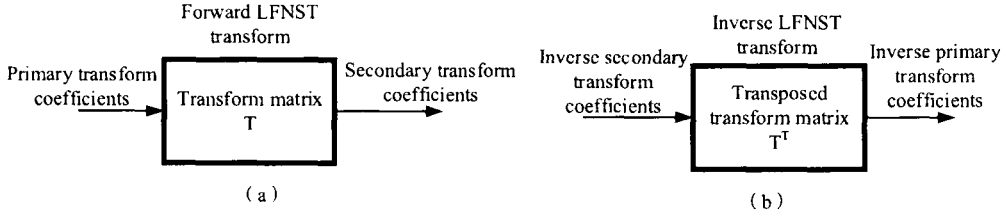
FIG. 5 illustrates a schematic structural diagram of a calculation process of matrix multiplication in the LFNST technique according to embodiments of the disclosure.

Here, the transform matrixes used by the forward LFNST transform and the reverse LFNST transform are mutually transposed. Referring to FIG. 5 which illustrates a schematic structural diagram of a calculation process of matrix multiplication in the LFNST technique according to embodiments of the disclosure. As illustrated in FIG. 5, (a) illustrates the calculation process of forward LFNST transform, where secondary transform coefficients may be obtained from primary transform coefficients after passing through the transform matrix T; and (b) illustrates the calculation process of inverse LFNST transform, where inverse primary transform coefficients may be obtained from inverse secondary transform coefficients after passing through the transposed transform matrix TT.

Further, in the LFNST technique, whether 4×4 inseparable transform or 8×8 inseparable transform is to be used may be decided according to the size of the current block. Here, "4×4 inseparable transform" may be collectively referred to as "4×4 LFNST", and "8×8 inseparable transform" may be collectively referred to as "8×8 LFNST". Assuming that the current block has a width nTbW and a height nTbH, then it can be concluded that if min (nTbW, nTbH)<=4, then 4×4 LFNST may be used for the current block; otherwise, 8×8 LFNST may be used for the current block. It is to be noted that the return value of min (A, B) is the smaller one of A and B.

In an implementation, for the 4×4 LFNST, at the encoder side, 16 coefficients will be input, and 16 or 8 coefficients will be output after forward LFNST; at the decoder side, 16 or 8 coefficients will be input, and 16 coefficients will be output. That is to say, the number of inputs and the number of outputs at the encoder side are contrary those at the decoder side.

It is assumed that the size of the transform unit (TU) may be denoted by nTbW×nTbH. The transform unit is a predicted residual block obtained based on a prediction error. That is to say, the size of the TU may be 4×4, or may be 4×N or N×4 (N>4). Detailed description is made hereinafter.

Figure 6A:
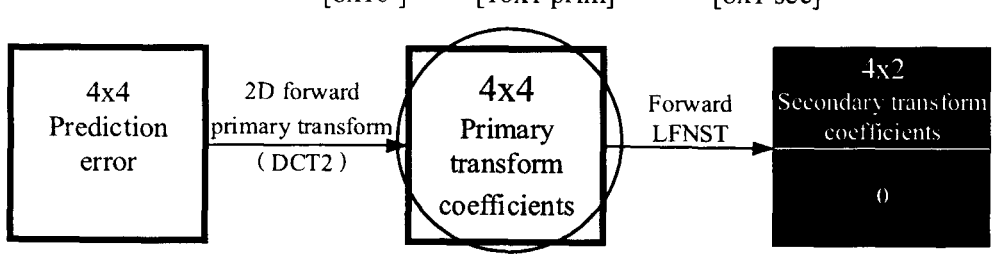
FIG. 6A illustrates a structural block diagram of LFNST transform in related technical solutions.

When the size of the TU is 4×4, the forward LFNST process corresponding to the 4×4 transform unit is as illustrated in FIG. 6A. In FIG. 6A, the white block is a prediction error, the grey block is a first transform coefficient, and the black block is a secondary transform coefficient. Here, at the position of "0" example, the encoder sets the transform coefficient to 0. For the 4×4 transform unit, the size of the transform matrix used in forward LFNST is 8×16; and 4×4 primary transform coefficients in the current transform unit are all used as input, and output is 4×2 secondary transform coefficients.

When the size of the TU is 4×N or N×4 (N>4), the forward LFNST process corresponding to the 4×N or N×4 transform unit is as illustrated in FIG. 6B. In FIG. 6B, the white block is a prediction error, the grey block is a primary transform coefficient, and the black block is a secondary transform coefficient. Here, for the 4×N or N×4 transform unit, the size of the transform matrix used in forward LFNST is 16×16; and primary transform coefficients in the first 4×4 sub-block (specifically, the uppermost sub-block in the case of a 4×N transform unit, and the leftmost sub-block in the case of an N×4 transform unit) in the current transform unit are all used as input, and output is 4×4 secondary transform coefficients. Here, at the position of "0" example, the encoder still sets the transform coefficients to 0.

In another implementation, for the 8×8 LFNST, at the encoder side, 48 coefficients will be input, and 16 or 8 coefficients will be output after forward LFNST; at the decoder side, 16 or 8 coefficients will be input, and 48 coefficients will be output. That is to say, the number of inputs and the number of outputs at the encoder side are contrary those at the decoder side.

When the size of the TU is 8×8, the forward LFNST process corresponding to the 8×8 transform unit is as illustrated in FIG. 6C. In FIG. 6C, the white block is a prediction error, the grey block is a primary transform coefficient, and the black block is a secondary transform coefficient. For the 8×8 transform unit, the size of the transform matrix used in forward LFNST is 8×48; and primary transform coefficients of former three 4×4 sub-blocks (i.e., three sub-blocks at the upper left corner) in the current transform unit are all used as input, and output is 4×2 secondary transform coefficients. Here, at the position of "0" example, the encoder still sets the transform coefficients to 0.

When the size of the TU is greater than 8×8, the forward LFNST process corresponding to the transform unit greater than 8×8 is as illustrated in FIG. 6D. In FIG. 6D, the white block is a prediction error, the grey block is a primary transform coefficient, and the black block is a secondary transform coefficient. For the transform unit greater than 8×8, the size of the transform matrix used in forward LFNST is 48×16; and primary transform coefficients of former three 4×4 sub-blocks (i.e., three sub-blocks at the upper left corner) in the current transform unit are all used as input, and output is 4×4 secondary transform coefficients. Here, at the position of "0" example, the encoder still sets the transform coefficients to 0.

As such, no matter the TU corresponding to the prediction error has a size of 4×4, a size of 4×N/N×4 (N>), a size of 8×8, or even a size greater than 8×8, the prediction error may be transformed according to FIG. 6A, FIG. 6B, FIG. 6C or FIG. 6D.

It is to be noted that, after the LFNST transform kernel candidate set is selected, the value of an LFNST index number (lfnst_idx) may be obtained by parsing the bitstream; and according to the value of lfnst_idx, a transform matrix (transform kernel) indicated by lfnst_idx may be selected from the LFNST transform kernel candidate set. For example, when lfnst_idx is 1, a first transform matrix may be used as the LFNST transform kernel in the decoding process; when lfnst_idx is 2, a second transform matrix may be used as the LFNST transform kernel in the decoding process.

Further, each transform matrix (transform kernel) contains basic transform matrices of two sizes, and the sizes of basic transform matrixes used at the decoder side are 16×16 and 48×16. Selection is made according to nLfnstOutSzie. If nLfnstOutSzie is 16, a 16×16 basic transform matrix is selected. Alternatively, if nLfnstOutSzie is 48, a 48×16 base transform matrix is selected. Alternatively, if nonZeroSize is 8, only the first 8 rows of the transform matrix are used for the matrix multiplication calculation.

Further, a secondary transform coefficient vector u[i] as an input, and is multiplied by a transform matrix to obtain a primary transform coefficient vector v[j], where i=0, 1, . . . , nonZeroSize−1, and j=0, 1, . . . , nLfnstOutSzie−1. Assuming that the transform matrix obtained through the previous operations is lowFreqTransMatrix, the specific calculation process of v[i] is as follows.

$$v[j] = \text{Clip3}\Big(\textit{Coeff}\text{Min}, \textit{Coeff}\text{Max}, \tag{7}$$
$$\Big(\sum\nolimits_{j=0}^{nonZeroSize-1} lowFreqTransMatrix[j][i] \times u[i] + 64\Big)? 7\Big)$$

Here, Clip3 is a clipping operation, and can limit the value of a coefficient to between the following two numbers, $$\textit{Coeff}\text{Min} = -(1 = 15) \tag{8}$$
$$\textit{Coeff}\text{Max} = (1 = 15) - 1 \tag{9}$$

Thus, after the above matrix calculation, transform of the transform coefficients can be realized. Here, for 4×4 LFNST, at the decoder side, 16 or 8 coefficients will be input and 16 coefficients will be output; while for 8×8 LFNST, at the decoder side, 16 or 8 coefficients will be input, and 48 coefficients will be output to realize LFNST transform of the transform coefficients.

Figure 7:
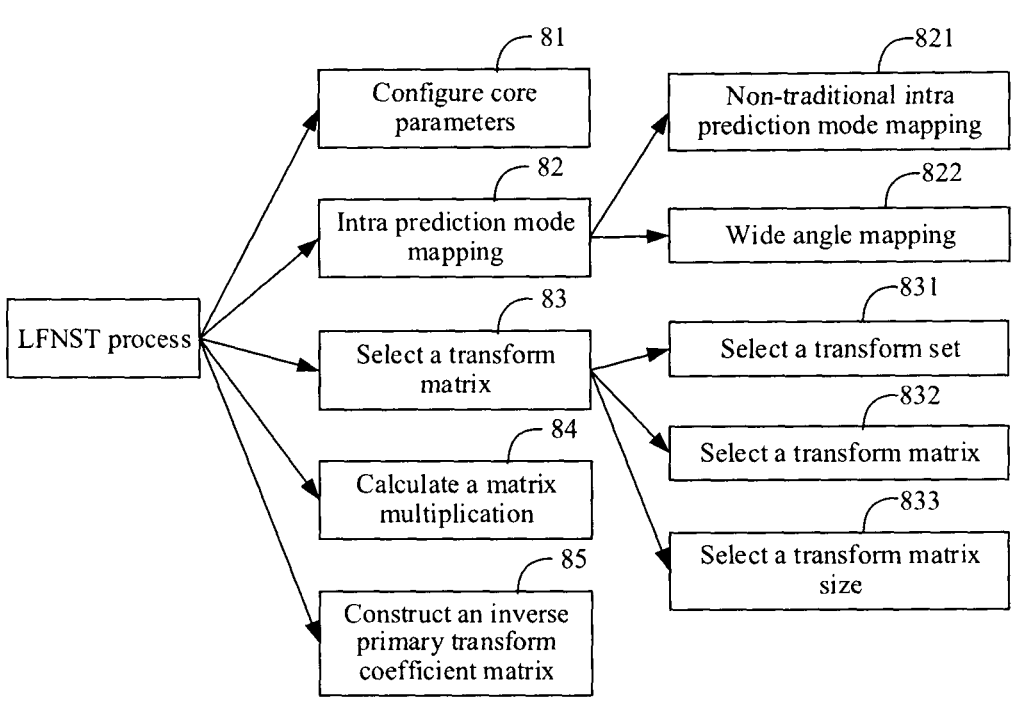
FIG. 7 illustrates a flowchart of a particular LFNST process according to embodiments of the disclosure.

It is to be noted that, as illustrated in FIG. 7, a particular LFNST process may include following operations: configuring core parameters 81, intra prediction mode mapping 82, selecting a transform matrix 83, calculating a matrix multiplication 84, constructing a primary transform coefficient matrix 85 and so on. Regarding intra prediction mode mapping 82, this operation is used to determine the value of predModeIntra, and may mainly include: non-traditional intra prediction mode mapping 821 and wide angle mapping 822. Regarding selecting the transform matrix 83, this operation is used for selecting a transform set and a transform matrix, and may mainly include: selecting the transform set 831, selecting a transform matrix 832, and selecting a transform matrix size 833.

Regarding configuring the core parameters 81, a length (which may be denoted by nonZeroSize) of an input secondary transform coefficient vector and a length (which may be denoted by nLfnstOutSzie) of an output primary transform coefficient vector for the LFNST calculation need to be configured at first. The value of nonZeroSize and nLfnstOutSzie are as illustrated in table 2.

TABLE 2

| Transform unit size | nonZeroSize | nLfnstOutSzie |
|---|---|---|
| 4 × 4 | 8 | 16 |
| 4 × N or N × 4 (N > 4) | 16 | 16 |
| 8 × 8 | 8 | 48 |
| >8 × 8 | 16 | 48 |

Configuration of parameters such as nonZeroSize and nLfnstOutSzie may be calculated through the following formulas.

$$nLfnstOutSize=(nTbW>=8\&\&nTbH>=8)?48:16 \tag{10}$$
$$nonZeroSize=(nTbW==4\&\&nTbH==4) \tag{11}$$
$$\|(nTbW==8\&\&nTbH==8)?8:16$$

Besides, the parameter nLfnstSize also needs to be configured, which indicates that there are primary transform coefficients only within the range of former nLfnstSize× nLfnstSize elements in the current block. The value of nLfnstSize is as below:

$$\text{Log2}LfnstSize=(nTbW>=8\&\&nTbH >= 8)?3:2 \tag{12}$$
$$nLfnstSize=1<< \text{Log2}LfnstSize \tag{13}$$

In this case, by parsing the bitstream, an intra prediction mode of a luma or chroma component the current block or a current coding block may also be obtained; then the value of predModeIntra may be determined using the previous calculation formula.

Further, a secondary transform coefficient vector u[i] is obtained, i=0, 1, . . . , nonZeroSize−1. When it is determined that LFNST has been used for the current transform unit, the inverse quantized coefficients d[x][y] are secondary transform coefficients. The first nonZeroSize values are obtained according to a diagonal scanning sequence, as the secondary transform coefficient vector u[i], i=0, 1, . . . , nonZeroSize−1. In the following formula, xC and yC are expressed as the abscissa and ordinate of the coefficient numbered x relative to the upper left corner point within the current block. xC and yC are as shown below, $$xC = \text{Diag}ScanOrder[2][2][x][0] \tag{14}$$

$$xY = \text{Diag}ScanOrder[2][2][x][1] \tag{15}$$

$$u[i] = d[xC][yC] \tag{16}$$

In the embodiments of the disclosure, the applicability of the LFNST technique to the current block using the MIP mode can be improved, and the selection of the transform set (or transform kernel) can be made more flexible. By analyzing the characteristics of MIP prediction values, the mapping between the MIP mode and a traditional intra prediction mode is established. In the process of performing LFNST on a transform unit using MIP, the transform set (transform matrix) and scanning sequence are selected according to the mapped traditional prediction mode. The method has been tested on ECM4.0 under All Intra conditions at a 48 inter-frame interval, and can obtain BD-rate changes of −0.08%, 0.05%, and −0.10% on Y, Cb, and Cr respectively (that is, the average bit rate changes under the same PSNR), thus improving the decoding efficiency.

Figure 8:
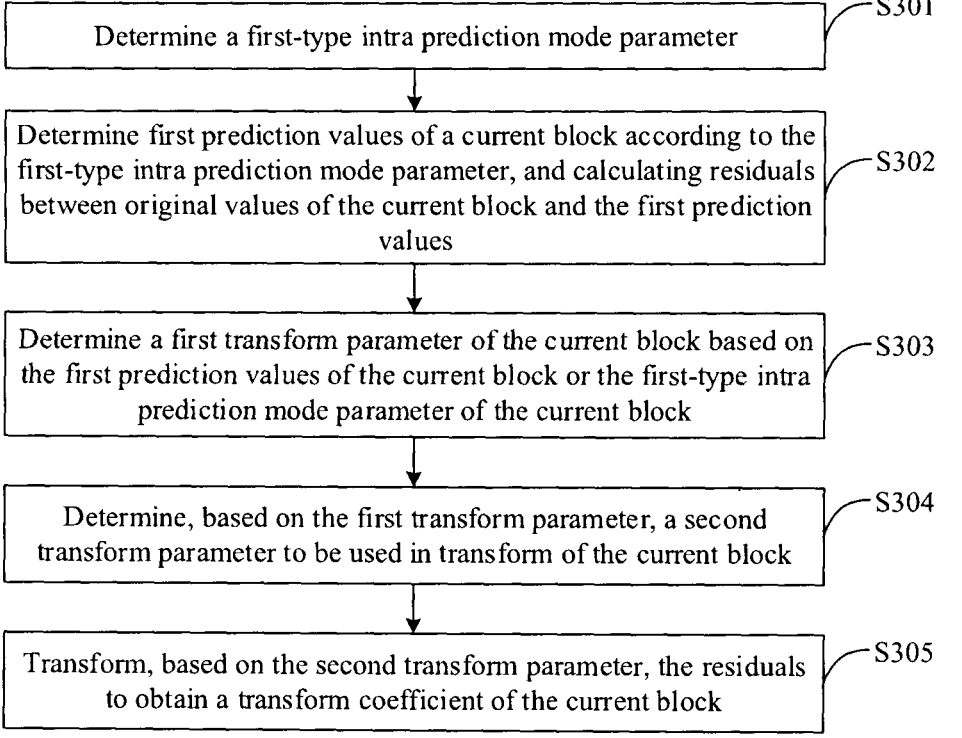
FIG. 8 illustrates a schematic flowchart of another method for video encoding according to embodiments of the disclosure.

Based on the application scenario example of FIG. 2A above, please refer to FIG. 8 which illustrates a schematic flowchart of a method for video encoding according to embodiments of the disclosure. As illustrated in FIG. 8, the method may include following operations S301 to S305.

S301, a first-type intra prediction mode parameter is determined.

It is to be noted that a video picture may be divided into multiple picture blocks, and each picture block currently to be encoded may be referred to as a Coding Block (CB). Here, each coding block may include a first colour component, a second colour component, and a third colour component; and the current block is a coding block of which a first colour component, a second colour component, or a third colour component is to be predicted in the video picture.

Assuming that a first colour component of the current block is to be predicted, and the first colour component is a luma component, that is, the colour component to be predicted is a luma component, the current block may also be called a luma block. Alternatively, assuming that a second colour component of the current block is to be predicted, and the second colour component is a chroma component, that is, the colour component to be predicted is a chroma component, the current block may also be called a chroma block.

It is also to be noted that, a prediction mode parameter indicates a coding mode of the current block and parameters related to the mode. Generally, the prediction mode parameter of the current block may be determined by way of rate distortion optimization (RDO).

In particular, in some embodiments, the operation that a prediction mode parameter of a current block is determined may include following:

A colour component to be predicted of the current block is determined.

Based on parameters of the current block, prediction coding is performed on the colour component to be predicted by using multiple prediction modes respectively, and a rate-distortion cost result corresponding to each of the multiple prediction modes is calculated.

A minimum rate-distortion cost result is selected from multiple rate-distortion cost results obtained by calculation, and a prediction mode corresponding to the minimum rate-distortion cost result is determined as the prediction mode parameter of the current block.

That is to say, at the encoder side, the colour component to be predicted may be encoded for the current block using multiple prediction modes respectively. Here, the multiple prediction modes usually include traditional intra prediction modes and non-traditional intra prediction modes. The traditional intra prediction modes may further include such as a direct current (DC) mode, a planar mode, and an angular prediction mode. The non-traditional intra prediction modes may further include such as a MIP mode, a CCLM mode, an IBC mode, and a PLT mode.

In this way, after encoding the current block by using multiple prediction modes respectively, the rate-distortion cost result corresponding to each prediction mode can be obtained. Then, a minimum rate-distortion cost result may be selected from multiple rate-distortion cost results obtained by calculation, and a prediction mode corresponding to the minimum rate-distortion cost result may be determined as the prediction mode parameter of the current block. As such, the determined prediction mode may be used to encode the current block finally, and there are reduced prediction residuals and improved coding efficiency in this prediction mode.

S302, first prediction values of a current block are determined according to the first-type intra prediction mode parameter, and residuals between original values of the current block and the first prediction values are calculated.

S303, a first transform parameter of the current block is determined based on the first prediction values of the current block or the first-type intra prediction mode parameter of the current block.

S304, a second transform parameter for transforming the current block is determined based on the first transform parameter.

S305, the residuals are transformed based on the second transform parameter, to obtain transform coefficients of the current block.

In the embodiments of the disclosure, the decoder may determine the first transform parameter of the current block based on the first prediction values of the current block. The decoder may also determine the first transform parameter of the current block based on the first-type intra prediction mode parameter of the current block. This is not limited in the disclosure.

In some embodiments of the disclosure, the implementation that the decoder determines the first transform parameter of the current block based on the first prediction values of the current block may include following.

S1, a first index of a second-type intra prediction mode of the current block is determined based on the first prediction values of the current block.

S2, the first transform parameter of the current block is determined based on the first index of the second-type intra prediction mode of the current block.

In the embodiments of the disclosure, the decoder may determine the first index of the second-type intra prediction mode of the current block based on the first prediction values of the current block. The second-type intra prediction mode includes at least one of: a planar mode, a direct current mode, or an angular intra prediction mode. Then the decoder may determine the first transform parameter of the current block based on the first index of the second-type intra prediction mode of the current block.

In the embodiments of the disclosure, the first transform parameter serves as the basis for determining the second transform parameter namely a transform kernel index parameter (referring to a transform coefficient matrix index) and a scanning sequence parameter of transform parameters.

That is to say, the decoder may map a non-traditional intra prediction mode to a traditional intra prediction mode, and determine the first transform parameter of the current block through the first index of the traditional intra prediction mode, so that the second transform parameter to be subjected to parameter transform may be selected for the current block in the non-traditional intra prediction mode in a flexible way corresponding to the traditional intra prediction mode. The applicability of non-traditional intra prediction mode (the first-type intra prediction mode) is improved, the encoding efficiency is also improved; and picture quality in video can also be improved.

It is to be noted that, in the embodiments of the disclosure, the first prediction values may be final prediction values obtained through intra prediction with the first-type intra prediction mode, or may be intermediate prediction values obtained during intra prediction with the first-type intra prediction mode.

Exemplarily, for the MIP mode, the first prediction values may be final prediction values obtained after upsampling in MIP prediction, or may be intermediate prediction values obtained before upsampling in MIP prediction, which is not limited in the disclosure.

In some embodiments of the disclosure, the decoder may set the first transform parameter of the current block to be equal to the first index of the second-type intra prediction mode of the current block.

In some embodiments of the disclosure, the implementation of the operation S1 includes following. S201, an index set of second-type intra prediction modes corresponding to the first prediction values is determined based on the first prediction values of the current block.

S202, the first index of the second-type intra prediction mode of the current block is determined based on the index set of the second-type intra prediction modes corresponding to the first prediction values. The index set of the second-type intra prediction modes stores accumulative weight values corresponding to a portion or all of admissible values of indexes of the second-type intra prediction modes.

In some embodiments of the disclosure, for each of a portion or all of the first prediction values, a gradient value in a horizontal direction and a gradient value in a vertical direction of a respective sample point are determined. The index set of the second-type intra prediction modes corresponding to the first prediction values are determined based on gradient values in the horizontal direction and gradient values in the vertical direction of sample points corresponding to the portion or all of the first prediction values.

The operation that the encoder determines the index set of the second-type intra prediction modes corresponding to the first prediction values based on gradient values in the horizontal direction and gradient values in the vertical direction of the sample points corresponding to the portion or all of the first prediction values includes following operations (1) and (2).

(1) For each of the sample points, the encoder determines a gradient angle value of the sample point according to the gradient value in the horizontal direction and the gradient value in the vertical direction of the sample point. The encoder determines a second index of a second-type intra prediction mode corresponding to the gradient angle value of the sample point value according to the gradient angle value of the sample point. The encoder updates an accumulative weight value corresponding to the determined second index of the second-type intra prediction mode in the index set of the second-type intra prediction modes.

In some embodiments of the disclosure, the operation that for each of the sample points, the encoder determines a gradient angle value of the sample point according to the gradient value in the horizontal direction and the gradient value in the vertical direction of the sample point includes following: the encoder determines the gradient angle value of the sample point based on the gradient value in the horizontal direction, the gradient value in the vertical direction of the sample point, and a preset function. The preset function is an arc-tangent function, and the arc-tangent function is a ratio of the gradient value in the horizontal direction of the sample point to the gradient value in the vertical direction of the sample point.

In some embodiments of the disclosure, the operation that the encoder determines the gradient angle value of the sample point based on the gradient value in the horizontal direction, the gradient value in the vertical direction of the sample point, and the preset function includes following: the encoder processes, based on the arc-tangent function, the ratio of the gradient value in the horizontal direction of the sample point to the gradient value in the vertical direction of the sample point, to determine the gradient angle value of the sample point.

The preset function is a second mapping table of the gradient angle value of the sample point and the gradient value in the horizontal direction and the gradient value in the vertical direction of the sample point.

In some embodiments of the disclosure, the operation that the encoder determines the gradient angle value of the sample point based on the gradient value in the horizontal direction, the gradient value in the vertical direction of the sample point, and the preset function includes following: the encoder inputs, into the second mapping table, the gradient value in the horizontal direction and the gradient value in the vertical direction of the sample point or a ratio of the gradient value in the horizontal direction of the sample point to the gradient value in the vertical direction of the sample point, to output the gradient angle value of the sample point.

In some embodiments of the disclosure, the operation that the encoder determines the second index of the second-type intra prediction mode corresponding to the gradient angle value of the sample point value according to the gradient angle value of the sample point includes following: The encoder determines second-type intra prediction mode index value corresponding to an angular intra prediction direction having a minimum included angle with a direction indicated by the gradient angle value among angular intra prediction directions indicated by the portion or all of admissible values of the indexes of the second-type intra prediction modes. The encoder sets the second index of the second-type intra prediction mode corresponding to the gradient angle value to be the second-type intra prediction mode index value.

Alternatively, the encoder determines the second index of the second-type intra prediction mode corresponding to the gradient angle value of the sample point according to a preset third mapping table between gradient angle values and second-type intra prediction mode indexes.

The third mapping table represents correspondences between gradient angle values of different values or in different value ranges and the second-type intra prediction mode indexes.

(2), for each of the sample points, the encoder determines a gradient direction, a first gradient magnitude and a mode partition of the sample point according to the gradient value in the horizontal direction and the gradient value in the vertical direction of the sample point. The encoder determines the second index of the second-type intra prediction mode according to the gradient direction, the first gradient magnitude and the mode partition of the sample point. The encoder updates an accumulative weight value corresponding to the determined second index of the second-type intra prediction mode in the index set of the second-type intra prediction modes.

In some embodiments of the disclosure, for each of the sample points, the encoder determines the gradient direction, the first gradient magnitude and the mode partition of the sample point according to the gradient value in the horizontal direction and the gradient value in the vertical direction of the sample point includes following: The encoder determines the first gradient magnitude of the sample point based on the gradient value in the horizontal direction and the gradient value in the vertical direction of the sample point. The encoder performs second-type intra prediction mode partitioning for the sample point based on the gradient value in the horizontal direction and the gradient value in the vertical direction of the sample point, to determine a horizontal region index, a vertical region index and a gradient magnitude index of the sample point. The encoder determines the mode partition of the sample point based on the horizontal region index, the vertical region index and the gradient magnitude index of the sample point. The encoder determines the gradient direction of the sample point based on the gradient magnitude index of the sample point.

In some embodiments of the disclosure, the operation that the encoder determines the second index of the second-type intra prediction mode according to the gradient direction, the first gradient magnitude and the mode partition of the sample point includes following: The encoder determines a gradient offset ratio of the sample point according to the gradient direction of the sample point. The encoder determines a gradient offset ratio of the sample point according to the gradient direction of the sample point. The encoder determines a target second-type intra prediction mode corresponding to the mode partition of the sample point according to a preset fourth mapping table of mode partitions and mode indexes. The encoder determines the second index of the second-type intra prediction mode of the sample point by combining the target second-type intra prediction mode and the intra prediction mode index offset.

In some embodiments of the disclosure, the operation that the encoder updates an accumulative weight value corresponding to the determined second index of the second-type intra prediction mode in the index set of the second-type intra prediction modes includes following: The encoder increments, by a set numeric value, the accumulative weight value corresponding to the determined second index of the second-type intra prediction mode in the index set of the second-type intra prediction modes.

The set numeric value equals 1, or the set numeric value equals a sum (G) of an absolute value of the gradient value in the horizontal direction of the sample point and an absolute value of the gradient value in the vertical direction of the sample point.

In some embodiments of the disclosure, the operation that the encoder determines, based on the index set of the second-type intra prediction modes corresponding to the first prediction values, the first index of the second-type intra prediction mode of the current block includes following: the encoder sets the first index of the second-type intra prediction mode of the current block to be a second index of a second-type intra prediction mode corresponding to a maximum accumulative weight value in the index set of the second-type intra prediction modes corresponding to the first prediction values.

In some embodiments of the disclosure, the operation that the encoder determines the first index of the second-type intra prediction mode of the current block based on the first prediction values of the current block includes following: The encoder determines second-type intra prediction values of the current block according to a candidate second-type intra prediction mode. The encoder determines first index of the second-type intra prediction mode of the current block based on the first intra prediction values and the second-type intra prediction values.

The candidate second-type intra prediction mode includes one or more of: a planar mode, a direct current mode, or an angular intra prediction mode.

In some embodiments of the disclosure, the encoder determines a first prediction error of the first intra prediction values and the second-type intra prediction values. In response to that the first prediction error satisfies a first preset condition, the encoder determines an index value corresponding to the candidate second-type intra prediction mode as the first index of the second-type intra prediction mode of the current block.

The encoder may determine the first prediction error in the following two approaches Approach I: the first prediction error of the first prediction values and the second-type intra prediction values is determined according to a first error criterion.

The first prediction error is one of: a sum of absolute errors (SAD), a sum of squared errors (SSD), a mean absolute error (MAD) or a mean square error; and the first preset condition is that the first prediction error reaches a minimum value.

Approach II: the first prediction error of the first prediction values and the second-type intra prediction values is determined according to a second error criterion;

The second prediction error is one of: a signal to noise ratio (SNR), or a peak signal to noise ratio (PSNR); and the first preset condition is that the first prediction error reaches a maximum value.

In some embodiments of the disclosure, the implementation that the encoder determines the first transform parameter of the current block based on the first-type intra prediction mode parameter of the current block may include following. A first index of a second-type intra prediction mode of the current block is determined based on the first-type intra prediction mode parameter. The first transform parameter of the current block is determined based on the first index of the second-type intra prediction mode.

In some embodiments of the disclosure, the encoder may determine the first index of the second-type intra prediction mode of the current block based on the first-type intra prediction mode parameter in following two ways:

Approach I:

The encoder determines the first index of the second-type intra prediction mode of the current block according to a first preset mapping relationship of first-type intra prediction mode parameters and second-type intra prediction mode indexes.

The first-type intra prediction mode parameter includes a first-type intra prediction mode index, and the first preset mapping relationship represents correspondences between first-type intra prediction mode indexes and second-type intra prediction mode indexes.

In some embodiments of the disclosure, the operation that the encoder determines the first index of the second-type intra prediction mode of the current block according to the first preset mapping relationship of the first-type intra prediction mode parameters and the second-type intra prediction mode indexes includes following: The encoder determines the first index of the second-type intra prediction mode of the current block from the first preset mapping relationship according to the first-type intra prediction mode index.

Approach II:

The encoder determines the first index of the second-type intra prediction mode of the current block based on a first-type intra prediction mode weight matrix indicated by the first-type intra prediction mode parameter.

In some embodiments of the disclosure, the operation that the encoder determines the first index of the second-type intra prediction mode of the current block based on the first-type intra prediction mode weight matrix indicated by the first-type intra prediction mode parameter includes following: The encoder determines a gradient parameter of the first-type intra prediction mode weight matrix. The encoder determines the first index of the second-type intra prediction mode of the current block based on the gradient parameter of the first-type intra prediction mode weight matrix.

For S2, the operation that the encoder determines the first transform parameter of the current block based on the first index of the second-type intra prediction mode includes following: the encoder performs wide angle mapping on the first index of the second-type intra prediction mode, to determine a wide-angle prediction mode index; and determines the first transform parameter based on the wide-angle prediction mode index.

In some embodiments of the disclosure, the operation that the encoder determines the second transform parameter for transforming the current block based on the first transform parameter includes following: the encoder determines the second transform parameter corresponding to the first transform parameter according to a preset first mapping table between first transform parameters and second transform parameters.

The second transform parameter includes at least one of: a transform kernel index parameter (referring to the transform coefficient matrix index), or a scanning sequence parameter of transform parameters. The transform kernel index parameter indicates a transform kernel to be used in decoding the transform parameters of the current block, the scanning sequence parameter indicates a scanning sequence of the transform parameters of the current block, and the scanning sequence includes a horizontal sequence and a vertical sequence.

In some embodiments of the disclosure, the operation that the encoder transforms, based on the second transform parameter, the residuals to obtain the transform coefficient of the current block includes following: The encoder transforms the residuals to obtain a second transform coefficient. The encoder transforms the second transform coefficient using the scanning sequence parameter of the transform parameters, to obtain a second transform coefficient vector.

The encoder transforms the second transform coefficient vector using a transform matrix indicated by the transform kernel index parameter, to obtain a first transform coefficient vector. The encoder transforms the first transform coefficient vector to obtain a first transform coefficient. The encoder quantizes the first transform coefficient to obtain a quantization coefficient of the current block. The quantization coefficient is transform coefficients of the current block.

It is also to be noted that, the description and explanations of the operation that the encoder determines the first index of the second-type intra prediction mode is consistent with that of the decoder, which will not be described herein again. Differently, a prediction mode parameter indicates a coding mode of the current block and parameters related to the mode. The encoder may usually determine the prediction mode parameter of the current block by way of rate distortion optimization (RDO).

After determining the LFNST transform kernel used for the current block, the encoder sets an LFNST index number and writes same into a bitstream.

It is to be noted that since the LFNST transform kernel candidate set includes two or more preset transform kernels for MIP, the transform kernel used for the current block can be selected in a rate-distortion optimization manner in this case. Specifically, a Rate Distortion Cost (RDCost) may be calculated for each transform kernel using a rate distortion optimization method, and then a transform kernel having the smallest Rate Distortion Cost may be selected as the transform kernel used for the current block. That is, at the encoder side, an LFNST transform kernel may be selected by RDCost, and a corresponding index number (which can be denoted by LFNST_idx) corresponding to the selected LFNST transform kernel may be written into the video bitstream and transmitted to the decoder side.

It may be understood that, for the current block encoded using the first-type intra prediction mode (such as Matrix-based Intra Prediction (MIP)), since the first prediction values or the first-type intra prediction mode parameter of the current block is introduced in low-frequency non-separable transform (LFNST), the selection of a transform kernel or a transform matrix (corresponding to the second transform parameter) in the transform technique is more flexible. Thus, not only the applicability of non-traditional intra prediction mode (the first-type intra prediction mode) is improved, but also encoding efficiency is improved; and picture quality in video can also be improved.

Figure 9:
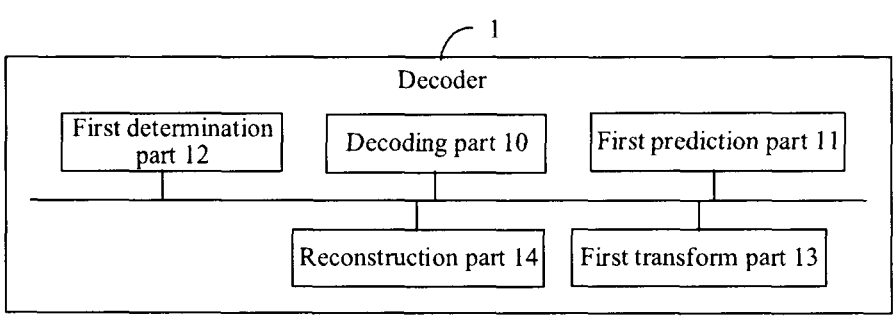
FIG. 9 illustrates a schematic structural diagram of composition of a decoder according to embodiments of the disclosure.

Based on similar inventive concept as the above embodiments, as illustrated in FIG. 9 which illustrates a schematic structural diagram of composition of a decoder 1 according to embodiments of the disclosure. As illustrated in FIG. 9, the decoder 1 may include a decoding part 10, a first prediction part 11, a first determination part 12, a first transform part 13 and a reconstruction part 14.

The decoding part 10 is configured to decode a bitstream to determine a first-type intra prediction mode parameter of a current block.

The first prediction part 11 is configured to determine first prediction values of the current block according to the first-type intra prediction mode parameter.

The first determination part 12 is configured to determine a first transform parameter of the current block based on the first prediction values of the current block or the first-type intra prediction mode parameter of the current block; and the first determination part 12 is configured to determine, based on the first transform parameter, a second transform parameter for transforming the current block.

The first transform part 13 is configured to transform, based on the second transform parameter, transform coefficients of the current block to determine residuals of the current block.

The reconstruction part 14 is configured to determine reconstructed values of the current block based on the residuals and the first prediction values.

In some embodiments of the disclosure, the operation that the first transform parameter of the current block is determined based on the first prediction values of the current block or the first-type intra prediction mode parameter of the current block includes following. A first index of a second-type intra prediction mode of the current block is determined based on the first prediction values of the current block. The first transform parameter of the current block is determined based on the first index of the second-type intra prediction mode of the current block.

In some embodiments of the disclosure, the operation that the first transform parameter of the current block is determined based on the first prediction values of the current block or the first-type intra prediction mode parameter of the current block includes following. A first index of a second-type intra prediction mode of the current block is determined based on the first-type intra prediction mode parameter. The first transform parameter of the current block is determined based on the first index of the second-type intra prediction mode.

In some embodiments of the disclosure, the second-type intra prediction mode includes at least one of: a planar mode, a direct current mode, or an angular intra prediction mode.

In some embodiments of the disclosure, the first determination part 12 is further configured to set the first transform parameter of the current block to be equal to the first index of the second-type intra prediction mode of the current block.

In some embodiments of the disclosure, the first transform part 13 is further configured to determine the second transform parameter corresponding to the first transform parameter according to a preset first mapping table between first transform parameters and second transform parameters.

In some embodiments of the disclosure, the second transform parameter includes at least one of: a transform kernel index parameter, or a scanning sequence parameter of transform parameters. The transform kernel index parameter indicates a transform kernel to be used in decoding the transform parameters of the current block. The scanning sequence parameter indicates a scanning sequence of the transform parameters of the current block. The scanning sequence includes a horizontal sequence and a vertical sequence.

In some embodiments of the disclosure, the first determination part 12 is further configured to determine, based on the first prediction values of the current block, an index set of second-type intra prediction modes corresponding to the first prediction values.

The first determination part 12 is further configured to determine, based on the index set of the second-type intra prediction modes corresponding to the first prediction values, the first index of the second-type intra prediction mode of the current block. The index set of the second-type intra prediction modes stores accumulative weight values corresponding to a portion or all of admissible values of indexes of the second-type intra prediction modes.

In some embodiments of the disclosure, the first determination part 12 is further configured to: for each of a portion or all of the first prediction values, determine a gradient value in a horizontal direction and a gradient value in a vertical direction of a respective sample point.

The first determination part 12 is further configured to determine the index set of the second-type intra prediction modes corresponding to the first prediction values based on gradient values in the horizontal direction and gradient values in the vertical direction of sample points corresponding to the portion or all of the first prediction values.

In some embodiments of the disclosure, the first determination part 12 is further configured to: for each of the sample points, determine a gradient angle value of the sample point according to the gradient value in the horizontal direction and the gradient value in the vertical direction of the sample point;

The first determination part 12 is further configured to determine a second index of a second-type intra prediction mode corresponding to the gradient angle value of the sample point value according to the gradient angle value of the sample point; and The first determination part 12 is further configured to update an accumulative weight value corresponding to the determined second index of the second-type intra prediction mode in the index set of the second-type intra prediction modes.

In some embodiments of the disclosure, the first determination part 12 is further configured to: determine the gradient angle value of the sample point based on the gradient value in the horizontal direction, the gradient value in the vertical direction of the sample point, and a preset function.

In some embodiments of the disclosure, the preset function is an arc-tangent function, and the arc-tangent function is a ratio of the gradient value in the horizontal direction of the sample point to the gradient value in the vertical direction of the sample point.

In some embodiments of the disclosure, the first determination part 12 is further configured to: process, based on the arc-tangent function, the ratio of the gradient value in the horizontal direction of the sample point to the gradient value in the vertical direction of the sample point, to determine the gradient angle value of the sample point.

In some embodiments of the disclosure, the preset function is a second mapping table of the gradient angle value of the sample point and the gradient value in the horizontal direction and the gradient value in the vertical direction of the sample point.

In some embodiments of the disclosure, the first determination part 12 is further configured to: input, into the second mapping table, the gradient value in the horizontal direction and the gradient value in the vertical direction of the sample point or a ratio of the gradient value in the horizontal direction of the sample point to the gradient value in the vertical direction of the sample point, to output the gradient angle value of the sample point.

In some embodiments of the disclosure, the first determination part 12 is further configured to: determine a second-type intra prediction mode index value corresponding to an angular intra prediction direction having a minimum included angle with a direction indicated by the gradient angle value among angular intra prediction directions indicated by the portion or all of admissible values of the indexes of the second-type intra prediction modes.

The first determination part 12 is further configured to set the second index of the second-type intra prediction mode corresponding to the gradient angle value to be the second-type intra prediction mode index value.

In some embodiments of the disclosure, the first determination part 12 is further configured to: determine the second index of the second-type intra prediction mode corresponding to the gradient angle value of the sample point according to a preset third mapping table between gradient angle values and second-type intra prediction mode indexes.

In some embodiments of the disclosure, the third mapping table represents correspondences between gradient angle values of different values or in different value ranges and the second-type intra prediction mode indexes.

In some embodiments of the disclosure, the first determination part 12 is further configured to: increment, by a set numeric value, the accumulative weight value corresponding to the determined second index of the second-type intra prediction mode in the index set of the second-type intra prediction modes.

In some embodiments of the disclosure, the set numeric value equals 1.

In some embodiments of the disclosure, the set numeric value equals a sum of an absolute value of the gradient value in the horizontal direction of the sample point and an absolute value of the gradient value in the vertical direction of the sample point.

In some embodiments of the disclosure, the first determination part 12 is further configured to: set the first index of the second-type intra prediction mode of the current block to be a second index of a second-type intra prediction mode corresponding to a maximum accumulative weight value in the index set of the second-type intra prediction modes corresponding to the first prediction values.

In some embodiments of the disclosure, the first determination part 12 is further configured to: determine second-type intra prediction values of the current block according to a candidate second-type intra prediction mode.

The first determination part 12 is further configured to: determine the first index of the second-type intra prediction mode of the current block based on the first intra prediction values and the second-type intra prediction values.

In some embodiments of the disclosure, the candidate second-type intra prediction mode includes one or more of: a planar mode, a direct current mode, or an angular intra prediction mode.

In some embodiments of the disclosure, the first determination part 12 is further configured to: determine a first prediction error of the first intra prediction values and the second-type intra prediction values.

The first determination part 12 is further configured to: in response to that the first prediction error satisfies a first preset condition, determine an index value corresponding to the candidate second-type intra prediction mode as the first index of the second-type intra prediction mode of the current block.

In some embodiments of the disclosure, the first determination part 12 is further configured to: determine the first prediction error of the first prediction values and the second-type intra prediction values according to a first error criterion.

The first prediction error is one of: a sum of absolute errors, a sum of squared errors, a mean absolute error or a mean square error; and the first preset condition is that the first prediction error reaches a minimum value.

In some embodiments of the disclosure, the first determination part 12 is further configured to: determine the first prediction error of the first prediction values and the second-type intra prediction values according to a second error criterion.

The second prediction error is one of: a signal to noise ratio, or a peak signal to noise ratio; and the first preset condition is that the first prediction error reaches a maximum value.

In some embodiments of the disclosure, the first determination part 12 is further configured to: for each of the sample points, determine a gradient direction, a first gradient magnitude and a mode partition of the sample point according to the gradient value in the horizontal direction and the gradient value in the vertical direction of the sample point.

The first determination part 12 is further configured to: determine the second index of the second-type intra prediction mode according to the gradient direction, the first gradient magnitude and the mode partition of the sample point.

The first determination part 12 is further configured to: update an accumulative weight value corresponding to the determined second index of the second-type intra prediction mode in the index set of the second-type intra prediction modes.

In some embodiments of the disclosure, the first determination part 12 is further configured to: determine the first gradient magnitude of the sample point based on the gradient value in the horizontal direction and the gradient value in the vertical direction of the sample point.

The first determination part 12 is further configured to: perform second-type intra prediction mode partitioning for the sample point based on the gradient value in the horizontal direction and the gradient value in the vertical direction of the sample point, to determine a horizontal region index, a vertical region index and a gradient magnitude index of the sample point.

The first determination part 12 is further configured to: determine the mode partition of the sample point based on the horizontal region index, the vertical region index and the gradient magnitude index of the sample point.

The first determination part 12 is further configured to: determine the gradient direction of the sample point based on the gradient magnitude index of the sample point.

In some embodiments of the disclosure, the first determination part 12 is further configured to: determine a gradient offset ratio of the sample point according to the gradient direction of the sample point.

The first determination part 12 is further configured to: map the gradient offset ratio of the sample point into a preset mode offset range, to obtain an intra prediction mode index offset of the sample point.

The first determination part 12 is further configured to: determine a target second-type intra prediction mode corresponding to the mode partition of the sample point according to a preset fourth mapping table of mode partitions and mode indexes.

The first determination part 12 is further configured to: determine the second index of the second-type intra prediction mode of the sample point by combining the target second-type intra prediction mode and the intra prediction mode index offset.

In some embodiments of the disclosure, the first determination part 12 is further configured to: determine the first index of the second-type intra prediction mode of the current block according to a first preset mapping relationship of first-type intra prediction mode parameters and second-type intra prediction mode indexes.

In some embodiments of the disclosure, the first-type intra prediction mode parameter includes a first-type intra prediction mode index, and the first preset mapping relationship represents correspondences between first-type intra prediction mode indexes and second-type intra prediction mode indexes.

The first determination part 12 is further configured to: determine the first index of the second-type intra prediction mode of the current block from the first preset mapping relationship according to the first-type intra prediction mode index.

In some embodiments of the disclosure, the first determination part 12 is further configured to: determine the first index of the second-type intra prediction mode of the current block based on a first-type intra prediction mode weight matrix indicated by the first-type intra prediction mode parameter.

In some embodiments of the disclosure, the first determination part 12 is further configured to determine a gradient parameter of the first-type intra prediction mode weight matrix.

The first determination part 12 is further configured to determine the first index of the second-type intra prediction mode of the current block based on the gradient parameter of the first-type intra prediction mode weight matrix.

In some embodiments of the disclosure, the first determination part 12 is further configured to: perform wide angle mapping on the first index of the second-type intra prediction mode, to determine a wide-angle prediction mode index; and determine the first transform parameter based on the wide-angle prediction mode index.

In some embodiments of the disclosure, the transform coefficient includes a quantization coefficient. The first transform part 13 is further configured to perform inverse quantization on the quantization coefficient, to obtain a first transform coefficient. The first transform part 13 is further configured to transform the first transform coefficient to obtain a first transform coefficient vector. The first transform part 13 is further configured to transform the first transform coefficient vector using a transform matrix indicated by the transform kernel index parameter, to obtain a second transform coefficient vector. The first transform part 13 is further configured to transform the second transform coefficient vector using the scanning sequence parameter of the transform parameters, to obtain a second transform coefficient. The first transform part 13 is further configured to perform inverse transform on the second transform coefficient to determine the residuals of the current block.

Figure 10:
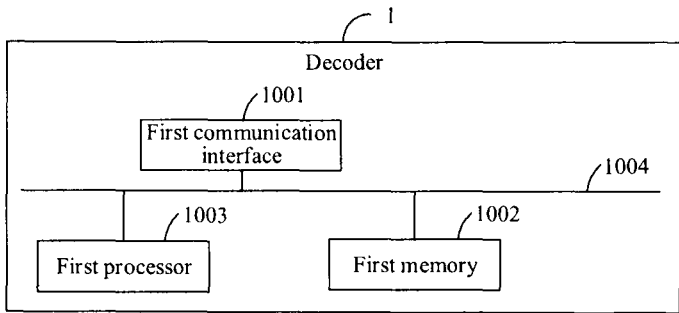
FIG. 10 illustrates a schematic structural diagram of particular hardware of a decoder according to embodiments of the disclosure.

Based on similar inventive concept as the above embodiments, as illustrated in FIG. 10 which illustrates a schematic structural diagram of composition of a decoder according to embodiments of the disclosure. As illustrated in FIG. 10, the decoder 1 may include a first memory 1002 and a first processor 1003.

The first memory 1002 is configured to store a computer program executable on the first processor 1003.

The first processor 1003 is configured to execute the computer program to implement a decoding method.

In some embodiments of the disclosure, the decoder further includes a first communication interface 1002. The first communication interface 1001 is configured to transceive signals during information transceiving with another external network element. The components are coupled together through a first bus system 1004. It may be understood that the first bus system 1004 is used for realizing the connection and communication between the components. Besides a data bus, the first bus system 1004 further includes a power bus, a control bus and a state signal bus. However, for clarity of description, the buses are all signed as the first bus system 1004 in FIG. 10.

It may be understood that the first memory 1002 in the embodiments of the disclosure may be a volatile memory or a non-volatile memory, or may include both a volatile memory and a non-volatile memory. The non-volatile memory may be a read-only memory (ROM), a programmable ROM (PROM), an erasable PROM (RPROM), an electrically RPROM (EEPROM), or a flash memory. The volatile memory may be a random access memory (RAM) that is used as an external cache. By way of example, but not limiting description, RAMs in many forms are available, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a directly rambus RAM (DR RAM). The first memory 1002 in the system and method described herein is intended to include but not limited to memories of these and any other suitable types.

The first processor 1003 may be an integrated circuit chip, and has the capability of signal processing. During implementation, the various steps of in the above method may be completed by an integrated logic circuit in hardware form or instructions in software form in the first processor 1003. The above first processor may be a general-purpose processor, a digital signal processor (DSP), an application specific integrated circuit (ASIC), a field programmable gate array (FPGA), or another programmable logical device, a discrete gate or a transistor logical device, or a discrete hardware component. The first processor may implement or perform the various methods, steps or logic blocks disclosed in the embodiments of the disclosure. The universal processor may be a microprocessor or the processor may also be any conventional processor and the like. The steps of the methods disclosed in combination with the embodiments of the disclosure may be directly embodied as being performed and completed by a hardware decoding processor, or being performed and completed by a combination of hardware and software modules in a decoding processor. The software module may be located in a mature storage medium in the art such as a random access memory, a flash memory, a read-only memory, a programmable read-only memory, an electrically erasable programmable, or a register. The storage medium is in the first memory 1002, and the first processor 1003 reads information from the first memory 1002 to implement steps of the above methods in combination with the hardware.

It may be understood that, the embodiments of the disclosure may be implemented by hardware, software, firmware, middleware, microcode or a combination thereof. For hardware implementation, a processing unit may be implemented in one or more application specific integrated circuits (ASICs), digital signal processors (DSPs), digital signal processing devices (DSPD), programmable logic devices (PLD), field-programmable gate arrays (FPGAs), universal processors, controllers, micro-controllers, microprocessors, or other electronic units for carrying out the functions of the disclosure, or a combination thereof. For software implementation, the technologies of the disclosure may be implemented by modules (for example, processes, or functions) carrying out the functions of the disclosure. Software code may be stored in a memory and executed by a processor. The memory may be implemented within or outside the processor.

Optionally, as another embodiment, the first processor 1003 is further configured to execute the computer program to implement the method of any above embodiment.

Figure 11:
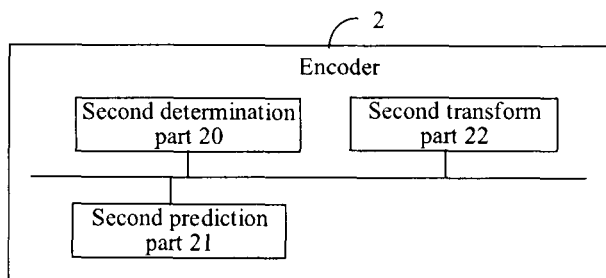
FIG. 11 illustrates a schematic structural diagram of composition of an encoder according to embodiments of the disclosure.

Based on similar inventive concept as the above embodiments, as illustrated in FIG. 11 which illustrates a schematic structural diagram of composition of an encoder 2 according to embodiments of the disclosure. As illustrated in FIG. 11, the encoder 2 may include a second determination part 20, a second prediction part 21, and a second transform part 22.

The second determination part 20 is configured to determine a first-type intra prediction mode parameter.

The second prediction part 21 is configured to determine first prediction values of the current block according to the first-type intra prediction mode parameter.

The second determination part 20 is further configured to: calculate residuals between original values of the current block and the first prediction values, determine a first transform parameter of the current block based on the first prediction values of the current block or the first-type intra prediction mode parameter of the current block, and determine, based on the first transform parameter, a second transform parameter for transforming the current block.

The second transform part 22 is configured to transform, based on the second transform parameter, the residuals to obtain transform coefficients of the current block.

In some embodiments of the disclosure, the second determination part 20 is further configured to determine a first index of a second-type intra prediction mode of the current block based on the first prediction values of the current block.

The second determination part 20 is further configured to determine the first transform parameter of the current block based on the first index of the second-type intra prediction mode of the current block.

In some embodiments of the disclosure, the operation that the first transform parameter of the current block is determined based on the first prediction values of the current block or the first-type intra prediction mode parameter of the current block includes following. A first index of a second-type intra prediction mode of the current block is determined based on the first-type intra prediction mode parameter. The first transform parameter of the current block is determined based on the first index of the second-type intra prediction mode.

In some embodiments of the disclosure, the second-type intra prediction mode includes at least one of: a planar mode, a direct current mode, or an angular intra prediction mode.

In some embodiments of the disclosure, the second determination part 20 is further configured to set the first transform parameter of the current block to be equal to the first index of the second-type intra prediction mode of the current block.

In some embodiments of the disclosure, the second transform part 22 is further configured to determine the second transform parameter corresponding to the first transform parameter according to a preset first mapping table between first transform parameters and second transform parameters.

In some embodiments of the disclosure, the second transform parameter includes at least one of: a transform kernel index parameter, or a scanning sequence parameter of transform parameters. The transform kernel index parameter indicates a transform kernel to be used in decoding the transform parameters of the current block. The scanning sequence parameter indicates a scanning sequence of the transform parameters of the current block. The scanning sequence includes a horizontal sequence and a vertical sequence.

In some embodiments of the disclosure, the second determination part 20 is further configured to determine, based on the first prediction values of the current block, an index set of second-type intra prediction modes corresponding to the first prediction values.

The second determination part 20 is further configured to determine, based on the index set of the second-type intra prediction modes corresponding to the first prediction values, the first index of the second-type intra prediction mode of the current block. The index set of the second-type intra prediction modes stores accumulative weight values corresponding to a portion or all of admissible values of indexes of the second-type intra prediction modes.

In some embodiments of the disclosure, the second determination part 20 is further configured to: for each of a portion or all of the first prediction values, determine a gradient value in a horizontal direction and a gradient value in a vertical direction of a respective sample point.

The second determination part 20 is further configured to determine the index set of the second-type intra prediction modes corresponding to the first prediction values based on gradient values in the horizontal direction and gradient values in the vertical direction of sample points corresponding to the portion or all of the first prediction values.

In some embodiments of the disclosure, the second determination part 20 is further configured to: for each of the sample points, determine a gradient angle value of the sample point according to the gradient value in the horizontal direction and the gradient value in the vertical direction of the sample point.

The second determination part 20 is further configured to determine a second index of a second-type intra prediction mode corresponding to the gradient angle value of the sample point value according to the gradient angle value of the sample point.

The second determination part 20 is further configured to: update an accumulative weight value corresponding to the determined second index of the second-type intra prediction mode in the index set of the second-type intra prediction modes.

In some embodiments of the disclosure, the second determination part 20 is further configured to: determine the gradient angle value of the sample point based on the gradient value in the horizontal direction, the gradient value in the vertical direction of the sample point, and a preset function.

In some embodiments of the disclosure, the preset function is an arc-tangent function, and the arc-tangent function is a ratio of the gradient value in the horizontal direction of the sample point to the gradient value in the vertical direction of the sample point.

In some embodiments of the disclosure, the second determination part 20 is further configured to: process, based on the arc-tangent function, the ratio of the gradient value in the horizontal direction of the sample point to the gradient value in the vertical direction of the sample point, to determine the gradient angle value of the sample point.

In some embodiments of the disclosure, the preset function is a second mapping table of the gradient angle value of the sample point and the gradient value in the horizontal direction and the gradient value in the vertical direction of the sample point.

In some embodiments of the disclosure, the second determination part 20 is further configured to: input, into the second mapping table, the gradient value in the horizontal direction and the gradient value in the vertical direction of the sample point or a ratio of the gradient value in the horizontal direction of the sample point to the gradient value in the vertical direction of the sample point, to output the gradient angle value of the sample point.

In some embodiments of the disclosure, the second determination part 20 is further configured to: determine a second-type intra prediction mode index value corresponding to an angular intra prediction direction having a minimum included angle with a direction indicated by the gradient angle value among angular intra prediction directions indicated by the portion or all of admissible values of the indexes of the second-type intra prediction modes.

The second determination part 20 is further configured to set the second index of the second-type intra prediction mode corresponding to the gradient angle value to be the second-type intra prediction mode index value.

In some embodiments of the disclosure, the second determination part 20 is further configured to: determine the second index of the second-type intra prediction mode corresponding to the gradient angle value of the sample point according to a preset third mapping table between gradient angle values and second-type intra prediction mode indexes.

In some embodiments of the disclosure, the third mapping table represents correspondences between gradient angle values of different values or in different value ranges and the second-type intra prediction mode indexes.

In some embodiments of the disclosure, the second determination part 20 is further configured to: increment, by a set numeric value, the accumulative weight value corresponding to the determined second index of the second-type intra prediction mode in the index set of the second-type intra prediction modes.

In some embodiments of the disclosure, the set numeric value equals 1.

In some embodiments of the disclosure, the set numeric value equals a sum of an absolute value of the gradient value in the horizontal direction of the sample point and an absolute value of the gradient value in the vertical direction of the sample point.

In some embodiments of the disclosure, the second determination part 20 is further configured to: set the first index of the second-type intra prediction mode of the current block to be a second index of a second-type intra prediction mode corresponding to a maximum accumulative weight value in the index set of the second-type intra prediction modes corresponding to the first prediction values.

In some embodiments of the disclosure, the second determination part 20 is further configured to: determine second-type intra prediction values of the current block according to a candidate second-type intra prediction mode.

The second determination part 20 is further configured to: determine the first index of the second-type intra prediction mode of the current block based on the first intra prediction values and the second-type intra prediction values.

In some embodiments of the disclosure, the candidate second-type intra prediction mode includes one or more of: a planar mode, a direct current mode, or an angular intra prediction mode.

In some embodiments of the disclosure, the second determination part 20 is further configured to: determine a first prediction error of the first intra prediction values and the second-type intra prediction values.

The second determination part 20 is further configured to: in response to that the first prediction error satisfies a first preset condition, determine an index value corresponding to the candidate second-type intra prediction mode as the first index of the second-type intra prediction mode of the current block.

In some embodiments of the disclosure, the second determination part 20 is further configured to: determine the first prediction error of the first prediction values and the second-type intra prediction values according to a first error criterion.

The first prediction error is one of: a sum of absolute errors, a sum of squared errors, a mean absolute error or a mean square error; and the first preset condition is that the first prediction error reaches a minimum value.

In some embodiments of the disclosure, the second determination part 20 is further configured to: determine the first prediction error of the first prediction values and the second-type intra prediction values according to a second error criterion.

The second prediction error is one of: a signal to noise ratio, or a peak signal to noise ratio; and the first preset condition is that the first prediction error reaches a maximum value.

In some embodiments of the disclosure, the second determination part 20 is further configured to: for each of the sample points, determine a gradient direction, a first gradient magnitude and a mode partition of the sample point according to the gradient value in the horizontal direction and the gradient value in the vertical direction of the sample point.

The second determination part 20 is further configured to: determine the second index of the second-type intra prediction mode according to the gradient direction, the first gradient magnitude and the mode partition of the sample point.

The second determination part 20 is further configured to: update an accumulative weight value corresponding to the determined second index of the second-type intra prediction mode in the index set of the second-type intra prediction modes.

In some embodiments of the disclosure, the second determination part 20 is further configured to: determine the first gradient magnitude of the sample point based on the gradient value in the horizontal direction and the gradient value in the vertical direction of the sample point.

The second determination part 20 is further configured to: perform second-type intra prediction mode partitioning for the sample point based on the gradient value in the horizontal direction and the gradient value in the vertical direction of the sample point, to determine a horizontal region index, a vertical region index and a gradient magnitude index of the sample point.

The second determination part 20 is further configured to: determine the mode partition of the sample point based on the horizontal region index, the vertical region index and the gradient magnitude index of the sample point.

The second determination part 20 is further configured to: determine the gradient direction of the sample point based on the gradient magnitude index of the sample point.

In some embodiments of the disclosure, the second determination part 20 is further configured to: determine a gradient offset ratio of the sample point according to the gradient direction of the sample point.

The second determination part 20 is further configured to: map the gradient offset ratio of the sample point into a preset mode offset range, to obtain an intra prediction mode index offset of the sample point.

The second determination part 20 is further configured to: determine a target second-type intra prediction mode corresponding to the mode partition of the sample point according to a preset fourth mapping table of mode partitions and mode indexes.

The second determination part 20 is further configured to: determine the second index of the second-type intra prediction mode of the sample point by combining the target second-type intra prediction mode and the intra prediction mode index offset.

In some embodiments of the disclosure, the second determination part 20 is further configured to: determine the first index of the second-type intra prediction mode of the current block according to a first preset mapping relationship of first-type intra prediction mode parameters and second-type intra prediction mode indexes.

In some embodiments of the disclosure, the first-type intra prediction mode parameter includes a first-type intra prediction mode index, and the first preset mapping relationship represents correspondences between first-type intra prediction mode indexes and second-type intra prediction mode indexes.

The second determination part 20 is further configured to: determine the first index of the second-type intra prediction mode of the current block from the first preset mapping relationship according to the first-type intra prediction mode index.

In some embodiments of the disclosure, the second determination part 20 is further configured to: determine the first index of the second-type intra prediction mode of the current block based on a first-type intra prediction mode weight matrix indicated by the first-type intra prediction mode parameter.

In some embodiments of the disclosure, the second determination part 20 is further configured to determine a gradient parameter of the first-type intra prediction mode weight matrix.

The second determination part 20 is further configured to determine the first index of the second-type intra prediction mode of the current block based on the gradient parameter of the first-type intra prediction mode weight matrix.

In some embodiments of the disclosure, the second determination part 20 is further configured to: perform wide angle mapping on the first index of the second-type intra prediction mode, to determine a wide-angle prediction mode index; and determine the first transform parameter based on the wide-angle prediction mode index.

In some embodiments of the disclosure, the second transform part 22 is further configured to: transform the residuals to obtain a second transform coefficient. The second transform part 22 is further configured to: transform the second transform coefficient using the scanning sequence parameter of the transform parameters, to obtain a second transform coefficient vector. The second transform part 22 is further configured to: transform the second transform coefficient vector using a transform matrix indicated by the transform kernel index parameter, to obtain a first transform coefficient vector. The second transform part 22 is further configured to: transform the first transform coefficient vector to obtain a first transform coefficient. The second transform part 22 is further configured to: quantize the first transform coefficient to obtain a quantization coefficient of the current block. The quantization coefficient is transform coefficients of the current block.

Figure 12:
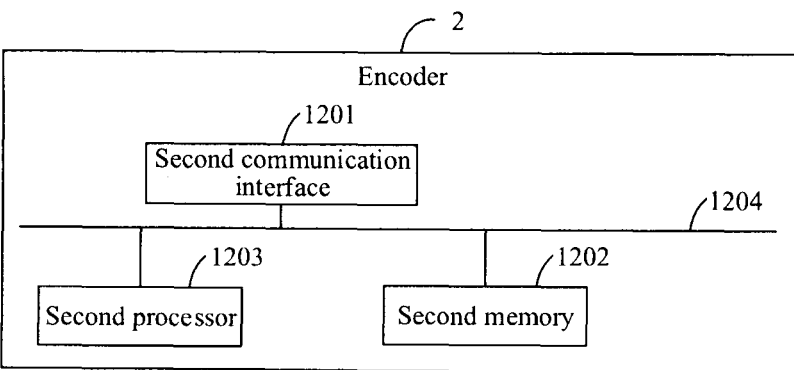
FIG. 12 illustrates a schematic structural diagram of particular hardware of an encoder according to embodiments of the disclosure.

Based on similar inventive concept as the above embodiments, as illustrated in FIG. 12 which illustrates a schematic structural diagram of composition of an encoder according to embodiments of the disclosure. As illustrated in FIG. 12, the encoder may include a second communication interface 1201, a second memory 1202 and a second processor 1203. The components are coupled together through a second bus system 1204. It may be understood that the second bus system 1204 is used for realizing the connection and communication between the components. Besides a data bus, the second bus system 1204 further includes a power bus, a control bus and a state signal bus. However, for clarity of description, the buses are all signed as the second bus system 1204 in FIG. 12.

The second communication interface 1201 is configured to transceive signals during information transceiving with another external network element.

The second memory 1202 is configured to store a computer program executable on the second processor 1203.

The second processor 1203 is configured to execute the computer program to implement an encoding method.

It may be understood that the hardware function of the second memory 1202 is similar to the hardware function of the first memory 1002, and the hardware function of the second processor 1203 is similar to the hardware function of the first processor 1003, which will not be detailed here again.

Embodiments of the disclosure provide a computer-readable storage medium having stored thereon a computer program that, when executed by a first processor, implements the decoding method, or that, when executed by a second processor, implements the encoding method.

Stated above is merely detailed description of the disclosure, but the scope of protection of the disclosure is not limited thereto. Any modification or replacement that are easily conceivable by those familiar with the related art within the technical range disclosed by the disclosure shall fall within the scope of protection of the disclosure. Therefore, the scope of protection of the disclosure should be subjected to the claimed scope of the claims.

INDUSTRIAL APPLICABILITY

In embodiments of the disclosure, first prediction values of the current block are determined according to the first-type intra prediction mode parameter. A first transform parameter of the current block is determined based on the first prediction values of the current block or the first-type intra prediction mode parameter of the current block. A second transform parameter for transforming the current block is determined based on the first transform parameter. Transform coefficients of the current block is transformed based on the second transform parameter, to determine residuals of the current block. Reconstructed values of the current block are determined based on the residuals and the first prediction values. As such, for the current block encoded using the first-type intra prediction mode (such as Matrix-based Intra Prediction (MIP)), since the first prediction values or the first-type intra prediction mode parameter of the current block is introduced in low-frequency non-separable transform (LFNST), the selection of a transform kernel or a transform matrix (corresponding to the second transform parameter) in the transform technique is more flexible. Thus, not only the applicability of non-traditional intra prediction mode (the first-type intra prediction mode) is improved, but also decoding efficiency is improved; and picture quality in video can also be improved.

The invention claimed is:

1. A method for decoding a video, applied to a decoder and comprising:

decoding a bitstream to determine a first-type intra prediction mode of a current block;

determining first prediction values of the current block according to the first-type intra prediction mode;

determining a first transform parameter of the current block based on the first prediction values of the current block or the first-type intra prediction mode of the current block;

determining, based on the first transform parameter, a second transform parameter for transforming the current block, wherein the second transform parameter comprises an index parameter of a transform kernel candidate set;

transforming, based on the second transform parameter, transform coefficients of the current block to determine residuals of the current block; and determining reconstructed values of the current block based on the residuals and the first prediction values, wherein determining the first transform parameter of the current block based on the first prediction values of the current block or the first-type intra prediction mode of the current block comprises:

determining a first index of a second-type intra prediction mode of the current block based on the first prediction values of the current block; and determining the first transform parameter of the current block based on the first index of the second-type intra prediction mode of the current block, wherein the method further comprises:

setting the first transform parameter of the current block to be equal to the first index of the second-type intra prediction mode of the current block.

2. The method of claim 1, wherein determining the first transform parameter of the current block based on the first prediction values of the current block or the first-type intra prediction mode of the current block comprises:

determining a first index of a second-type intra prediction mode of the current block based on the first-type intra prediction mode; and determining the first transform parameter of the current block based on the first index of the second-type intra prediction mode, wherein the second-type intra prediction mode comprises at least one of: a planar mode, a direct current mode, or an angular intra prediction mode.

3. The method of claim 1, wherein determining, based on the first transform parameter, the second transform parameter for transforming the current block comprises:

determining the second transform parameter corresponding to the first transform parameter according to a preset first mapping table between first transform parameters and second transform parameters, wherein the second transform parameter further comprises at least one of: a transform kernel index parameter, or a scanning sequence parameter of transform parameters, wherein the transform kernel index parameter indicates a transform kernel to be used in decoding the transform parameters of the current block, the scanning sequence parameter indicates a scanning sequence of the transform parameters, and the scanning sequence comprises a horizontal sequence and a vertical sequence.

4. The method of claim 1, wherein determining the first index of the second-type intra prediction mode of the current block based on the first prediction values of the current block comprises:

determining, based on the first prediction values, an index set of second-type intra prediction modes of the first prediction values; and determining, based on the index set of the second-type intra prediction modes of the first prediction values, the first index of the second-type intra prediction mode of the current block, wherein the index set of the second-type intra prediction modes stores accumulative weight values corresponding to a portion or all of admissible values of indexes of the second-type intra prediction modes, wherein determining, based on the first prediction values of the current block, the index set of the second-type intra prediction modes of the first prediction values comprises:

for each of a portion or all of the first prediction values, determining a gradient value in a horizontal direction and a gradient value in a vertical direction of a sample point corresponding to the first prediction value; and determining the index set of the second-type intra prediction modes of the first prediction values based on gradient values in the horizontal direction and gradient values in the vertical direction of sample points.

5. The method of claim 4, wherein determining the index set of the second-type intra prediction modes of the first prediction values based on gradient values in the horizontal direction and gradient values in the vertical direction of the sample points comprises:

determining a gradient angle value of the sample point according to the gradient value in the horizontal direction and the gradient value in the vertical direction of the sample point;

determining a second index of a second-type intra prediction mode corresponding to the gradient angle value according to the gradient angle value of the sample point; and updating an accumulative weight value corresponding to the determined second index of the second-type intra prediction mode in the index set of the second-type intra prediction modes, wherein determining the gradient angle value of the sample point according to the gradient value in the horizontal direction and the gradient value in the vertical direction of the sample point comprises:

determining the gradient angle value of the sample point based on the gradient value in the horizontal direction, the gradient value in the vertical direction of the sample point, and a preset function.

6. The method of claim 5, wherein the preset function is an arc-tangent function, and the arc-tangent function is a ratio of the gradient value in the horizontal direction of the sample point to the gradient value in the vertical direction of the sample point; and determining the gradient angle value of the sample point based on the gradient value in the horizontal direction, the gradient value in the vertical direction of the sample point, and the preset function comprises:

processing, based on the arc-tangent function, the ratio of the gradient value in the horizontal direction of the sample point to the gradient value in the vertical direction of the sample point, to determine the gradient angle value of the sample point, or wherein the preset function is a second mapping table of the gradient angle value of the sample point and the gradient value in the horizontal direction and the gradient value in the vertical direction of the sample point; and determining the gradient angle value of the sample point based on the gradient value in the horizontal direction, the gradient value in the vertical direction of the sample point, and the preset function comprises: inputting, into the second mapping table, the gradient value in the horizontal direction and the gradient value in the vertical direction of the sample point, or a ratio of the gradient value in the horizontal direction of the sample point to the gradient value in the vertical direction of the sample point, to output the gradient angle value of the sample point.

7. The method of claim 5, wherein determining the second index of the second-type intra prediction mode corresponding to the gradient angle value of the sample point according to the gradient angle value of the sample point comprises: determining a second-type intra prediction mode index value corresponding to an angular intra prediction direction having a minimum included angle with a direction indicated by the gradient angle value among angular intra prediction directions indicated by the portion or all of admissible values of the indexes of the second-type intra prediction modes; and setting the second index of the second-type intra prediction mode corresponding to the gradient angle value to be the second-type intra prediction mode index value or wherein determining the second index of the second-type intra prediction mode corresponding to the gradient angle value of the sample point according to the gradient angle value of the sample point comprises: determining the second index of the second-type intra prediction mode corresponding to the gradient angle value according to a preset third mapping table between gradient angle values and second-type intra prediction mode indexes, wherein the third mapping table represents correspondences between gradient angle values of different values or in different value ranges and the second-type intra prediction mode indexes.

8. The method of claim 5, wherein updating the accumulative weight value corresponding to the determined second index of the second-type intra prediction mode in the index set of the second-type intra prediction modes comprises: incrementing, by a set numeric value, the accumulative weight value corresponding to the determined second index of the second-type intra prediction mode in the index set of the second-type intra prediction modes, wherein the set numeric value equals 1 or the set numeric value equals a sum of an absolute value of the gradient value in the horizontal direction and an absolute value of the gradient value in the vertical direction.

9. The method of claim 4, wherein determining, based on the index set of the second-type intra prediction modes of the first prediction values, the first index of the second-type intra prediction mode of the current block comprises:

setting the first index of the second-type intra prediction mode of the current block to be a second index of a second-type intra prediction mode corresponding to a maximum accumulative weight value in the index set of the second-type intra prediction modes corresponding to the first prediction values, wherein determining the first index of the second-type intra prediction mode of the current block based on the first prediction values of the current block comprises: determining second-type intra prediction values of the current block according to a candidate second-type intra prediction mode; and determining the first index of the second-type intra prediction mode of the current block based on the first intra prediction values and the second-type intra prediction values.

10. The method of claim 9, wherein the candidate second-type intra prediction mode comprises one or more of: a planar mode, a direct current mode, or an angular intra prediction mode, or wherein determining, based on the first intra prediction values and the second-type intra prediction values, the first index of the second-type intra prediction mode of the current block comprises: determining a first prediction error of the first intra prediction values and the second-type intra prediction values; determining an index value corresponding to the candidate second-type intra prediction mode corresponding to a case where the first prediction error satisfies a first preset condition as the first index of the second-type intra prediction mode of the current block.

11. A method for encoding a video, applied to an encoder and comprising:

determining a first-type intra prediction mode;

determining first prediction values of a current block according to the first-type intra prediction mode, and calculating residuals between original values of the current block and the first prediction values;

determining a first transform parameter of the current block based on the first prediction values of the current block or the first-type intra prediction mode of the current block;

determining, based on the first transform parameter, a second transform parameter for transforming the current block, wherein the second transform parameter comprises an index parameter of a transform kernel candidate set; and transforming, based on the second transform parameter, the residuals to obtain transform coefficients of the current block, wherein determining the first transform parameter of the current block according to the first prediction values of the current block or the first-type intra prediction mode of the current block comprises:

determining a first index of a second-type intra prediction mode of the current block based on the first prediction values of the current block; and determining the first transform parameter of the current block based on the first index of the second-type intra prediction mode of the current block, wherein the method further comprises:

setting the first transform parameter of the current block to be equal to the first index of the second-type intra prediction mode of the current block.

12. The method of claim 11, wherein determining the first transform parameter of the current block based on the first prediction values of the current block or the first-type intra prediction mode of the current block comprises:

determining a first index of a second-type intra prediction mode of the current block based on the first-type intra prediction mode; and determining the first transform parameter of the current block based on the first index of the second-type intra prediction mode.

13. The method of claim 11, wherein the second-type intra prediction mode comprises at least one of: a planar mode, a direct current mode, or an angular intra prediction mode.

14. The method of claim 11, wherein determining, based on the first transform parameter, the second transform parameter for transforming the current block comprises: determining the second transform parameter corresponding to the first transform parameter according to a preset first mapping table between first transform parameters and second transform parameters, or wherein the second transform parameter further comprises at least one of: a transform kernel index parameter, or a scanning sequence parameter of transform parameters, wherein the transform kernel index parameter indicates a transform kernel to be used in decoding the transform parameters of the current block, the scanning sequence parameter indicates a scanning sequence of the transform parameters, and the scanning sequence comprises a horizontal sequence and a vertical sequence.

15. The method of claim 11, wherein determining the first index of the second-type intra prediction mode of the current block based on the first prediction values of the current block comprises:

determining, based on the first prediction values, an index set of second-type intra prediction modes corresponding to the first prediction values; and determining, based on the index set of the second-type intra prediction modes of the first prediction values, the first index of the second-type intra prediction mode of the current block, wherein the index set of the second-type intra prediction modes stores accumulative weight values corresponding to a portion or all of admissible values of indexes of the second-type intra prediction modes, wherein determining, based on the first prediction values of the current block, the index set of the second-type intra prediction modes of the first prediction values comprises:

for each of a portion or all of the first prediction values, determining a gradient value in a horizontal direction and a gradient value in a vertical direction of a sample point corresponding to the first prediction value; and determining the index set of the second-type intra prediction modes of the first prediction values based on gradient values in the horizontal direction and gradient values in the vertical direction of sample points.

16. The method of claim 15, wherein determining the index set of the second-type intra prediction modes of the first prediction values based on gradient values in the horizontal direction and gradient values in the vertical direction of sample points comprises:

determining a gradient angle value of the sample point according to the gradient value in the horizontal direction and the gradient value in the vertical direction of the sample point;

determining a second index of a second-type intra prediction mode corresponding to the gradient angle value according to the gradient angle value of the sample point; and updating an accumulative weight value corresponding to the determined second index of the second-type intra prediction mode in the index set of the second-type intra prediction modes, wherein determining the gradient angle value of the sample point according to the gradient value in the horizontal direction and the gradient value in the vertical direction of the sample point comprises:

determining the gradient angle value of the sample point based on the gradient value in the horizontal direction, the gradient value in the vertical direction of the sample point, and a preset function.

17. The method of claim 16, wherein the preset function is an arc-tangent function, and the arc-tangent function is a ratio of the gradient value in the horizontal direction of the sample point to the gradient value in the vertical direction of the sample point; and determining the gradient angle value of the sample point based on the gradient value in the horizontal direction, the gradient value in the vertical direction of the sample point, and the preset function comprises:

processing, based on the arc-tangent function, the ratio of the gradient value in the horizontal direction of the sample point to the gradient value in the vertical direction of the sample point, to determine the gradient angle value of the sample point, or wherein the preset function is a second mapping table of the gradient angle value of the sample point and the gradient value in the horizontal direction and the gradient value in the vertical direction of the sample point; and determining the gradient angle value of the sample point based on the gradient value in the horizontal direction, the gradient value in the vertical direction of the sample point, and the preset function comprises:

inputting, into the second mapping table, the gradient value in the horizontal direction and the gradient value in the vertical direction of the sample point or a ratio of the gradient value in the horizontal direction of the sample point to the gradient value in the vertical direction of the sample point, to output the gradient angle value of the sample point.

18. A non-transitory computer-readable storage medium, having a computer program and a bitstream stored thereon, wherein the computer program, when executed by a processor, enables the processor to perform the steps of the encoding method of claim 11 to generate the bitstream.

* * * * *